United States Patent
Ono et al.

(10) Patent No.: US 9,847,532 B2
(45) Date of Patent: Dec. 19, 2017

(54) FUEL CELL ELECTRODE CATALYST LAYER, FUEL CELL ELECTRODE, FUEL CELL MEMBRANE ELECTRODE ASSEMBLY AND FUEL CELL HAVING A PROTON-CONDUCTIVE MATERIAL COATED ON A CATALYST THEREOF

(71) Applicant: NISSAN MOTOR CO., LTD., Yokohama-shi, Kanagawa (JP)

(72) Inventors: Yoshitaka Ono, Yokohama (JP); Atsushi Ohma, Yokohama (JP); Norifumi Horibe, Fujisawa (JP); Kenichi Toyoshima, Yokohama (JP); Ken Akizuki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 523 days.

(21) Appl. No.: 14/356,270

(22) PCT Filed: Sep. 21, 2012

(86) PCT No.: PCT/JP2012/074249
§ 371 (c)(1),
(2) Date: May 5, 2014

(87) PCT Pub. No.: WO2013/069380
PCT Pub. Date: May 16, 2013

(65) Prior Publication Data
US 2014/0287343 A1 Sep. 25, 2014

(30) Foreign Application Priority Data

Nov. 11, 2011 (JP) .................................. 2011-247610
Jun. 4, 2012 (JP) .................................. 2012-127269

(51) Int. Cl.
*H01M 4/10* (2006.01)
*H01M 4/86* (2006.01)
(Continued)

(52) U.S. Cl.
CPC ....... *H01M 4/8657* (2013.01); *H01M 4/8605* (2013.01); *H01M 4/8642* (2013.01);
(Continued)

(58) Field of Classification Search
CPC .. H01M 4/8605; H01M 4/8668; H01M 4/926; H01M 4/8657; H01M 4/8642;
(Continued)

(56) References Cited

U.S. PATENT DOCUMENTS

2002/0127452 A1 9/2002 Wilkinson et al.

FOREIGN PATENT DOCUMENTS

EP 1 336 996 A1 8/2003
EP 2 593 985 5/2013
(Continued)

OTHER PUBLICATIONS

European Search Report, dated Mar. 3, 2015, 11 pages.
(Continued)

*Primary Examiner* — Gary Harris
(74) *Attorney, Agent, or Firm* — Foley & Lardner LLP

(57) ABSTRACT

A fuel cell electrode catalyst layer (13) of the preset invention includes: a catalyst (131*b*); a support (131*a*) that supports the catalyst; and two or more proton-conductive materials (133) different in dry mass value per mole of a proton-donating group, the proton-conductive materials being in contact with at least a part of the catalyst and at least a part of the support. Then, a proton-conductive material in which a dry mass value per mole of the proton-donating group is highest among the proton-conductive materials is in
(Continued)

contact with at least a part of the catalyst, and has a largest contact ratio with a surface of the catalyst.

18 Claims, 17 Drawing Sheets

(51) Int. Cl.
  *H01M 4/92* (2006.01)
  *H01M 4/88* (2006.01)
(52) U.S. Cl.
  CPC ....... *H01M 4/8663* (2013.01); *H01M 4/8668* (2013.01); *H01M 4/8892* (2013.01); *H01M 4/926* (2013.01); *H01M 2250/20* (2013.01); *Y02T 90/32* (2013.01)
(58) Field of Classification Search
  CPC ............. H01M 4/8663; H01M 4/8892; H01M 2250/20; Y02T 90/32; Y02E 60/50
  USPC .................................................. 429/482, 483
  See application file for complete search history.

(56) References Cited

FOREIGN PATENT DOCUMENTS

| EP | 2 631 975 A1 | 8/2013 |
|---|---|---|
| JP | 10-284087 A | 10/1998 |
| JP | 11-40172 A | 2/1999 |
| JP | 11040172 A * | 2/1999 |
| JP | 2003-282067 A | 10/2003 |
| JP | 2006-134752 A | 5/2006 |
| JP | 2009-187848 A | 8/2009 |
| JP | 2012-123927 A | 6/2012 |
| WO | WO 95/15016 A1 | 6/1995 |
| WO | WO 2012/009142 A1 | 1/2012 |

OTHER PUBLICATIONS

Ram Subbaraman et al., Three phase Interfaces at Electrified Metal—Solid Electrolyte Systems 1, Study of the Pt(hkl)-Nafion Interface, Journal of Physical Chemistry C, 114. 2010, pp. 8414-8422.

David Thompsett, Catalysts for the Proton Exchange Membrane Fuel Cell, Fuel Cell Technology Handbook, Jan. 1, 2003, pp. 1-23.

* cited by examiner

FIG. 10
(a) 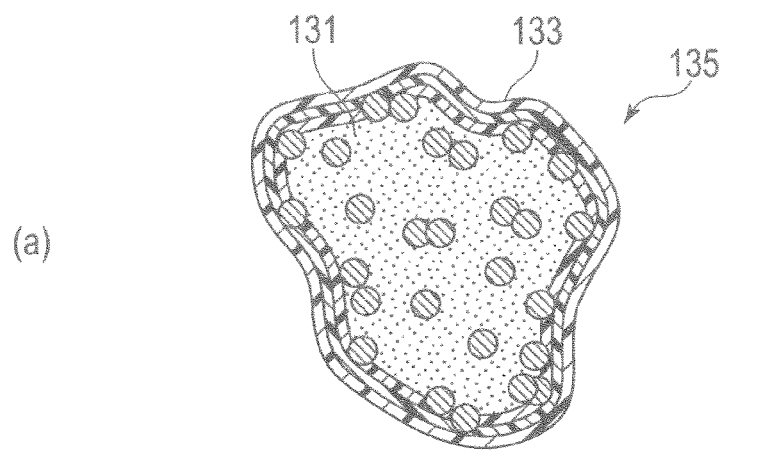
(b) 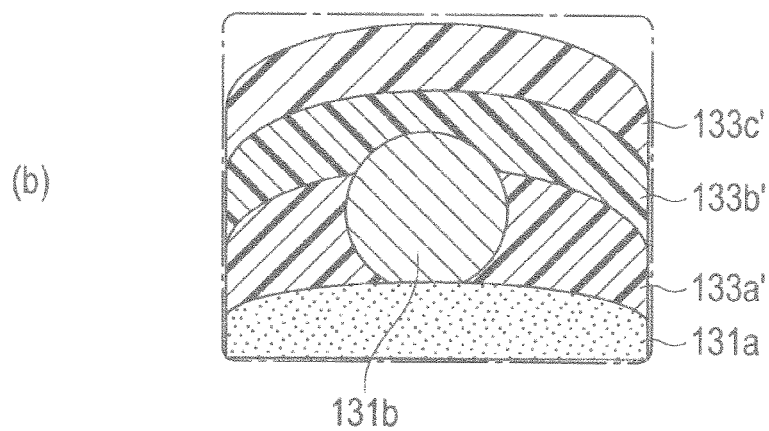
(c) 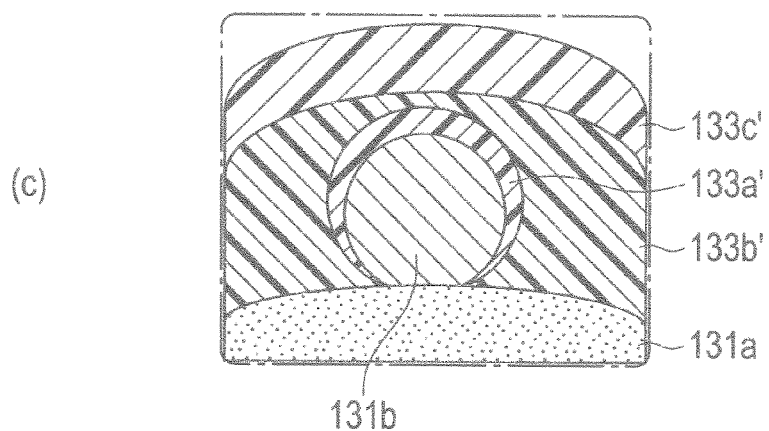

FIG. 15
(a)
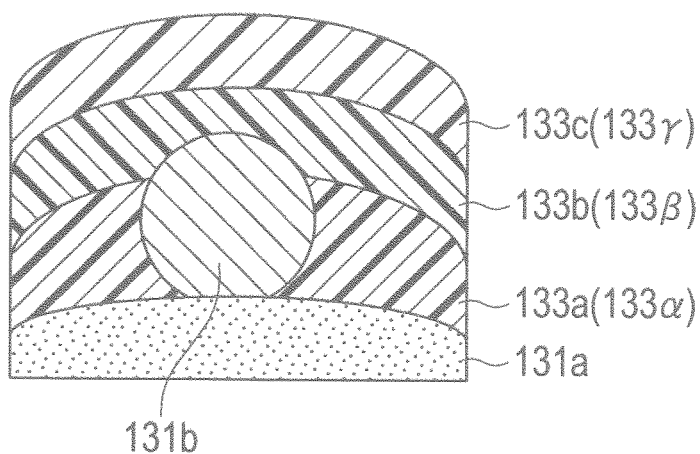
(b)
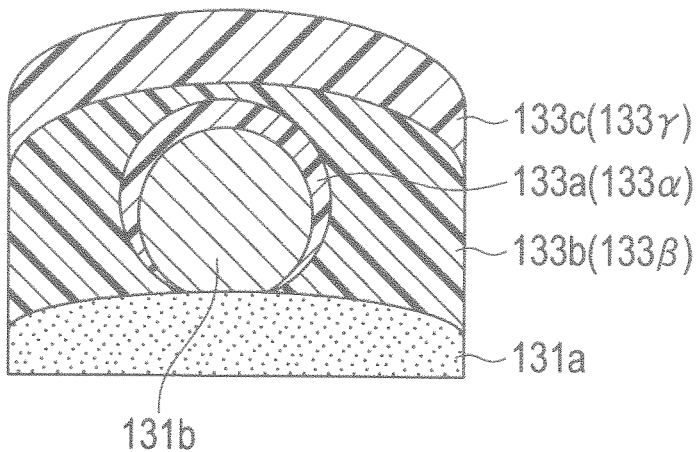

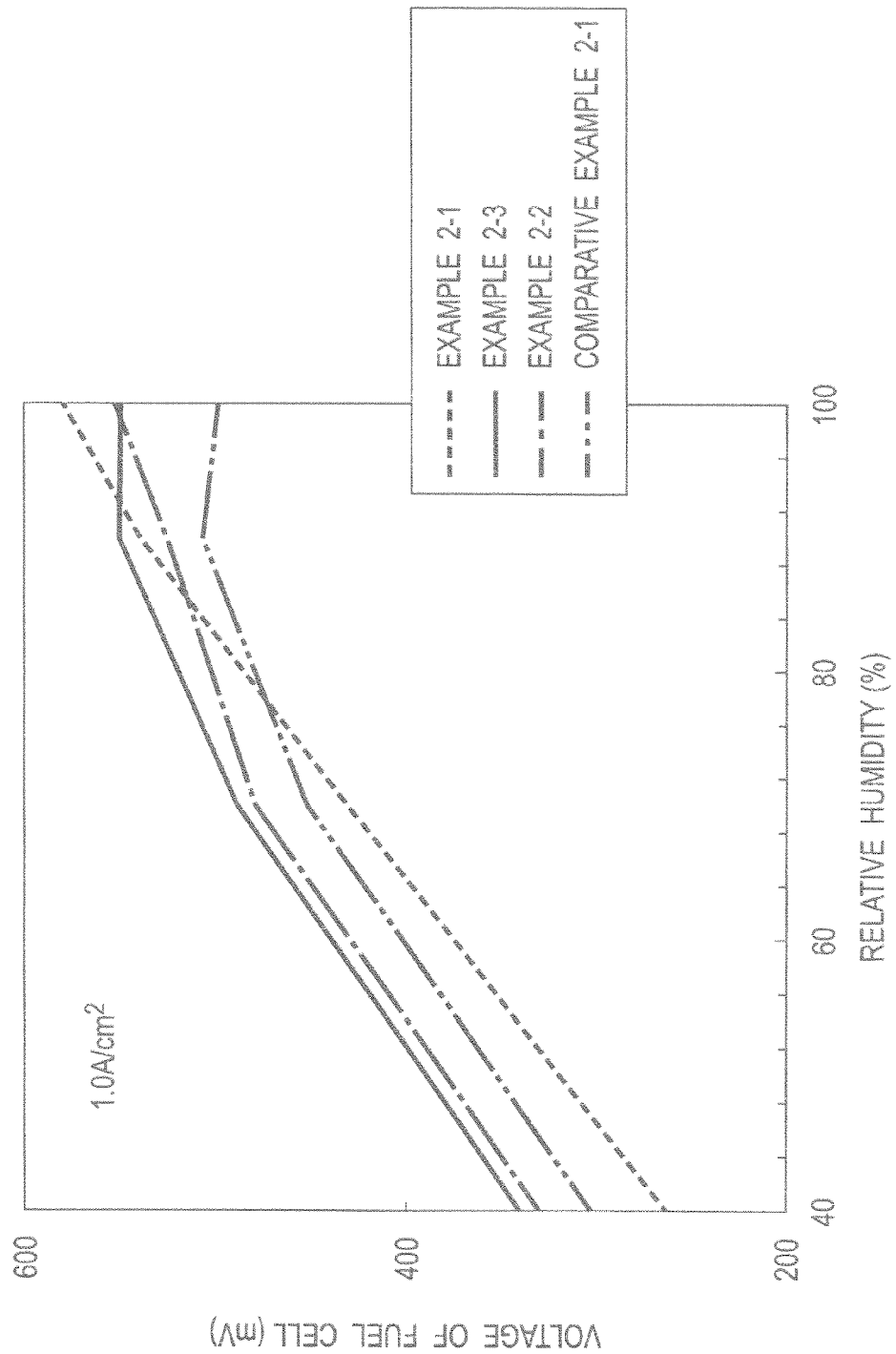

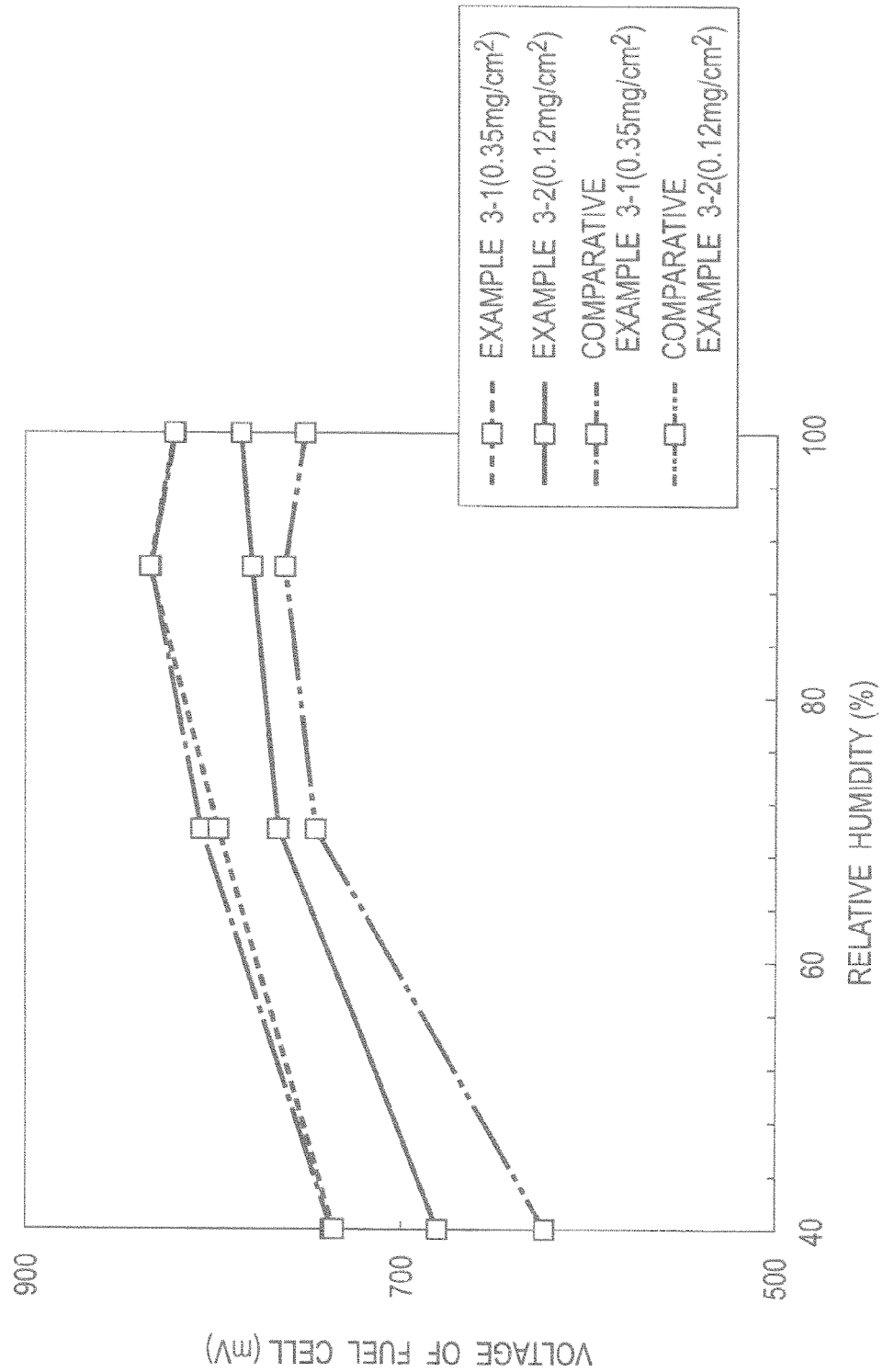

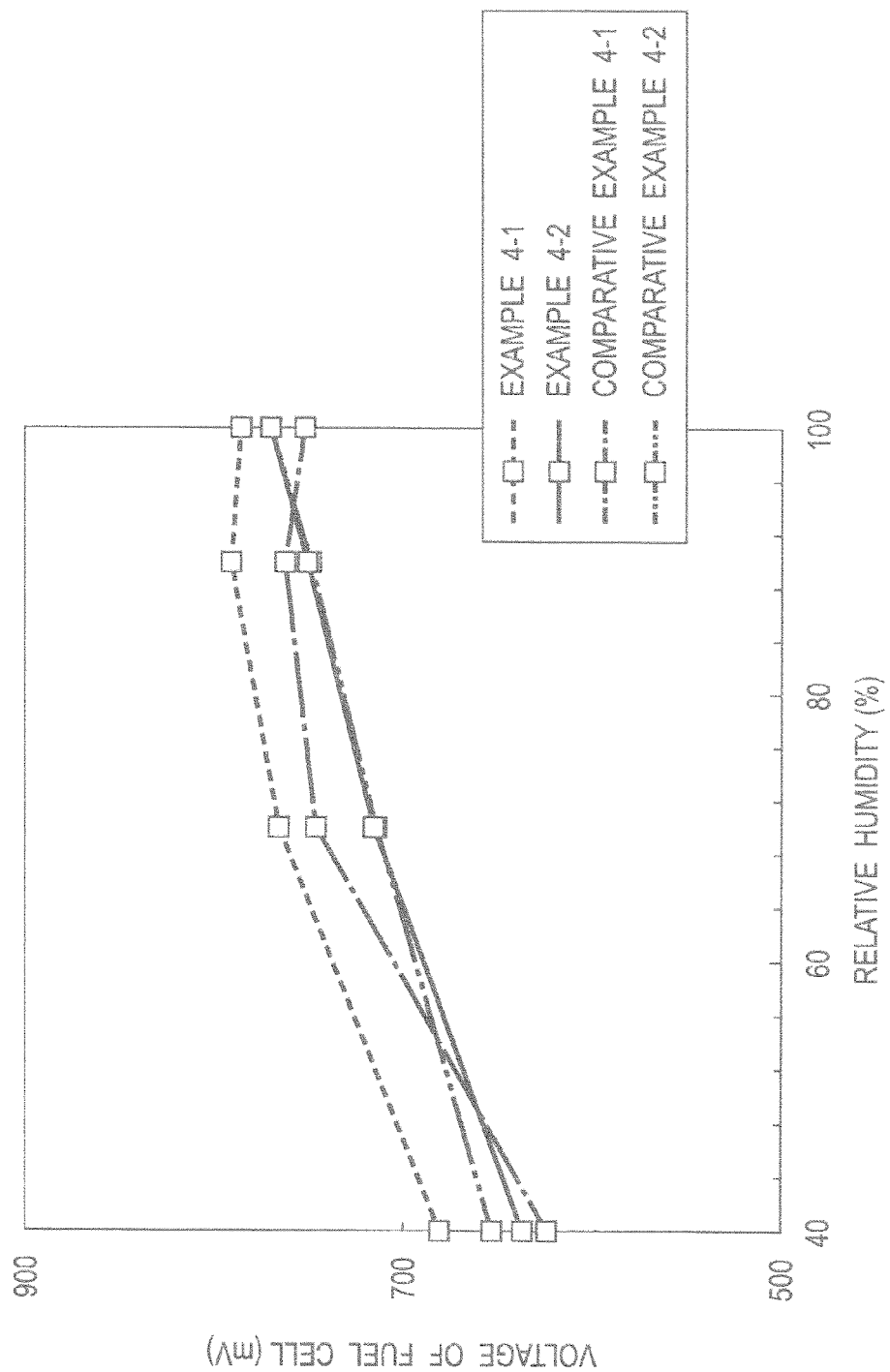

FUEL CELL ELECTRODE CATALYST LAYER, FUEL CELL ELECTRODE, FUEL CELL MEMBRANE ELECTRODE ASSEMBLY AND FUEL CELL HAVING A PROTON-CONDUCTIVE MATERIAL COATED ON A CATALYST THEREOF

TECHNICAL FIELD

The present invention relates to a fuel cell electrode catalyst layer, a fuel cell electrode, a fuel cell membrane electrode assembly, and a fuel cell. More specifically, the present invention relates to a fuel cell electrode catalyst layer, a fuel cell electrode, a fuel cell membrane electrode assembly, and a fuel cell, which are capable of realizing excellent power generation performance. The fuel cell as described above can be applied, for example, to a vehicle and the like. Moreover, as the fuel cell as described above, a polymer electrolyte fuel cell (PEFC) can be typically mentioned.

BACKGROUND ART

In general, a polymer electrolyte fuel cell has a structure in which a plurality of single cells exerting a power generation function are stacked on one another. Each of the single cells has a membrane electrode assembly (MEA) that includes a polymer electrolyte membrane (for example, NAFION (registered trademark, made by DuPont Corporation)) and a pair (anode, cathode) of electrode catalyst layers which sandwich the same therebetween. Moreover, this single cell sometimes has a membrane electrode gas diffusion layer assembly that includes a pair (anode, cathode) of gas diffusion layers (GDLs) which sandwich the membrane electrode assembly and serve for dispersing feed gas. Then, the membrane electrode assembly and the membrane electrode gas diffusion layer assembly, which each of the single cells has, are electrically connected to membrane electrode assemblies and membrane electrode gas diffusion layer assemblies of other single cells, which are adjacent thereto, while interposing separators therebetween. The single cells are stacked on and connected to one another as described above, whereby a fuel cell stack is configured. Then, this fuel cell stack is capable of functioning as power generation means usable for various purposes.

A description is briefly made of a power generation mechanism of the polymer electrolyte fuel cell. At an operation time of the polymer electrolyte fuel cell, fuel gas (for example, hydrogen gas) is supplied to an anode side of the single cell, and oxidant gas (for example, atmosphere, oxygen) is supplied to a cathode side thereof. As a result, electrochemical reactions represented by the following Reaction formulae (I) and (II) progress on the anode and the cathode, respectively, and electricity is created.

$$H_2 \rightarrow 2H^+ + 2e^- \quad (I)$$

$$2H^+ + 2e^- + (1/2)O_2 \rightarrow H_2O \quad (II)$$

In order to enhance power generation performance, it is important to enhance proton transport properties in Reaction formulae (I) and (II), and it is particularly important to enhance apparent catalytic activity in Reaction formula (II).

Heretofore, in order to achieve the enhancement of the proton transport properties and the apparent catalytic activity a fuel cell of Patent Literature 1 has been proposed. In the fuel cell of Patent Literature 1, a catalyst electrode layer, which has a catalyst, an electron conductor having the catalyst supported thereon, and predetermined proton-conductive resin formed so as to cover the electros conductor, is formed on an electrolyte membrane. Then, this predetermined proton-conductive resin contains at least two or more proton-conductive resins different in molecular weight. Moreover, the molecular weight of the proton-conductive resin present in micropores in aggregates of the electron conductor is smaller than the molecular weight of the proton-conductive resin present in micropores between the aggregates of the electron conductor.

CITATION LIST

Patent Literature

Patent Literature 1: Japanese Patent Unexamined Publication No. 2009-187848

SUMMARY OF INVENTION

However, in the fuel cell described in the foregoing Patent Literature 1, there has been a problem that sufficient power generation performance cannot be obtained in a case where a supported amount of the catalyst is lowered in a study of the inventors of the present invention.

The present invention has been made in consideration of the problems inherent in the conventional technology as described above. Then, it is an object of the present invention to provide a fuel cell electrode catalyst layer, a fuel cell electrode, a fuel cell membrane electrode assembly and a fuel cell, each of which is capable of realizing excellent power generation performance by enhancing the apparent catalytic activity and the proton transport properties even a case of lowering the supported amount of the catalyst.

A fuel cell electrode catalyst layer according to an aspect of the present invention includes: a catalyst; a support that supports the catalyst; and two or more proton-conductive materials different in dry mass value per mole of a proton-donating group, the proton-conductive materials being in contact with at least a part of the catalyst and at least a part of the support. Then, a proton-conductive material in which a dry mass value per mole of the proton-donating group is highest among the proton-conductive materials is in contact with at least a part of the catalyst, and has a largest contact ratio with a surface of the catalyst.

BRIEF DESCRIPTION OF DRAWINGS

FIG. 10(a) shows an explanatory view schematically showing a structure of a catalyzer that composes an electrode catalyst layer of a fuel cell according to a seventh embodiment. FIGS. 10(b) and 10(c) are explanatory views enlargedly showing peripheries of a catalyst particle in the catalyzer of FIG. 10(a).

FIGS. 15(a) and 15(b) are explanatory views enlargedly showing a structure of a catalyzer that composes an electrode catalyst layer of a fuel cell according to a twelfth embodiment.

FIG. 22 is a graph showing results of humidity dependence evaluations of power generation performance in membrane electrode assemblies of respective examples.

FIG. 23 is a graph showing results of humidity dependence evaluations of power generation performance in membrane electrode assemblies of respective examples.

FIG. 24 is a graph showing results of humidity dependence evaluations of power generation performance in membrane electrode assemblies of respective examples.

DESCRIPTION OF EMBODIMENTS

Figure 1:
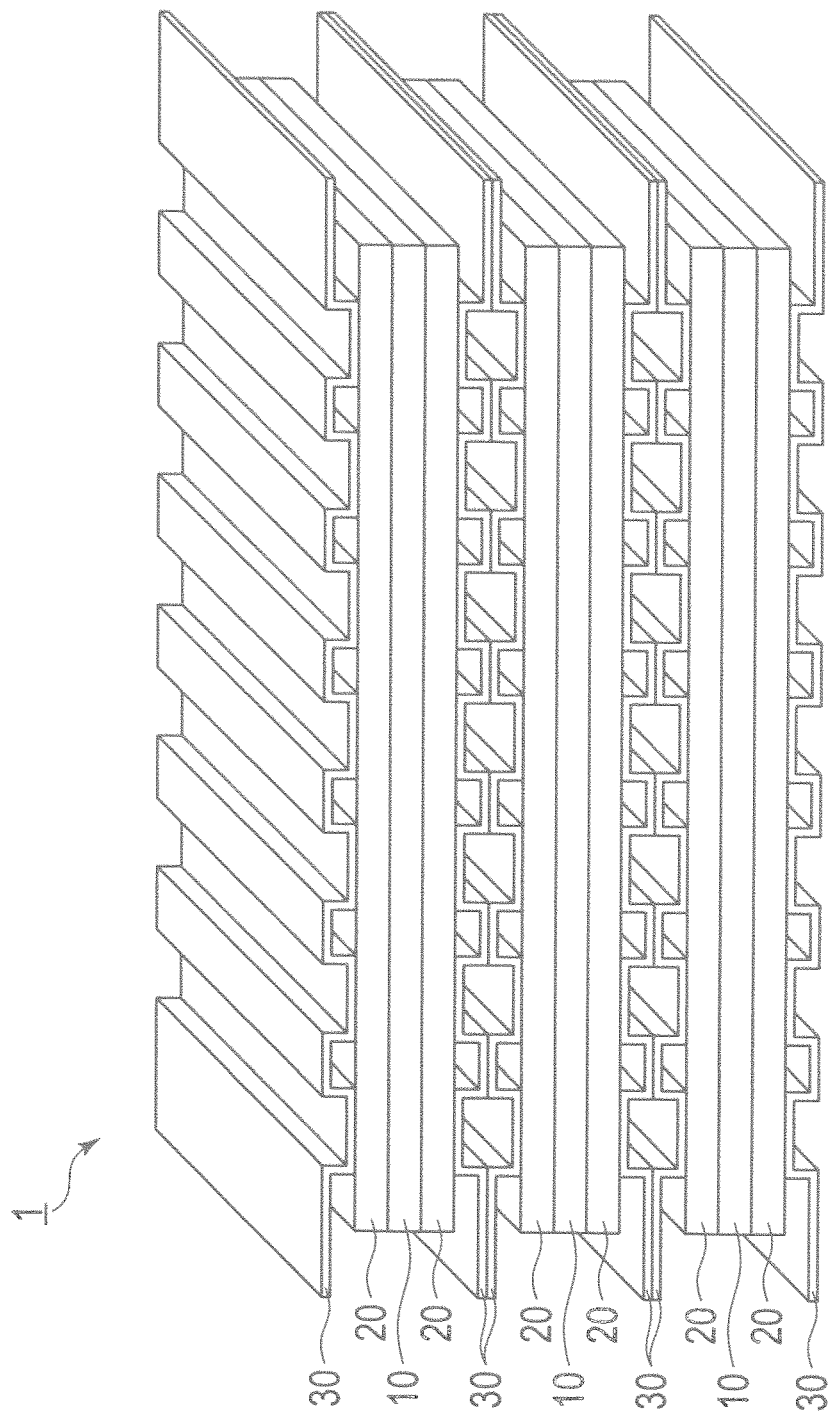
FIG. 1 is a perspective view showing an outline of a stack of fuel cells according to a first embodiment.

A description is made below in detail of a fuel cell electrode catalyst layer, a fuel cell electrode, a fuel cell membrane electrode assembly and a fuel cell according to embodiments of the present invention while referring to the drawings. It should be noted that dimensional ratios in the drawings are magnified for convenience of explanation and may be different front actual ratios.

[First Embodiment]

Figure 2:
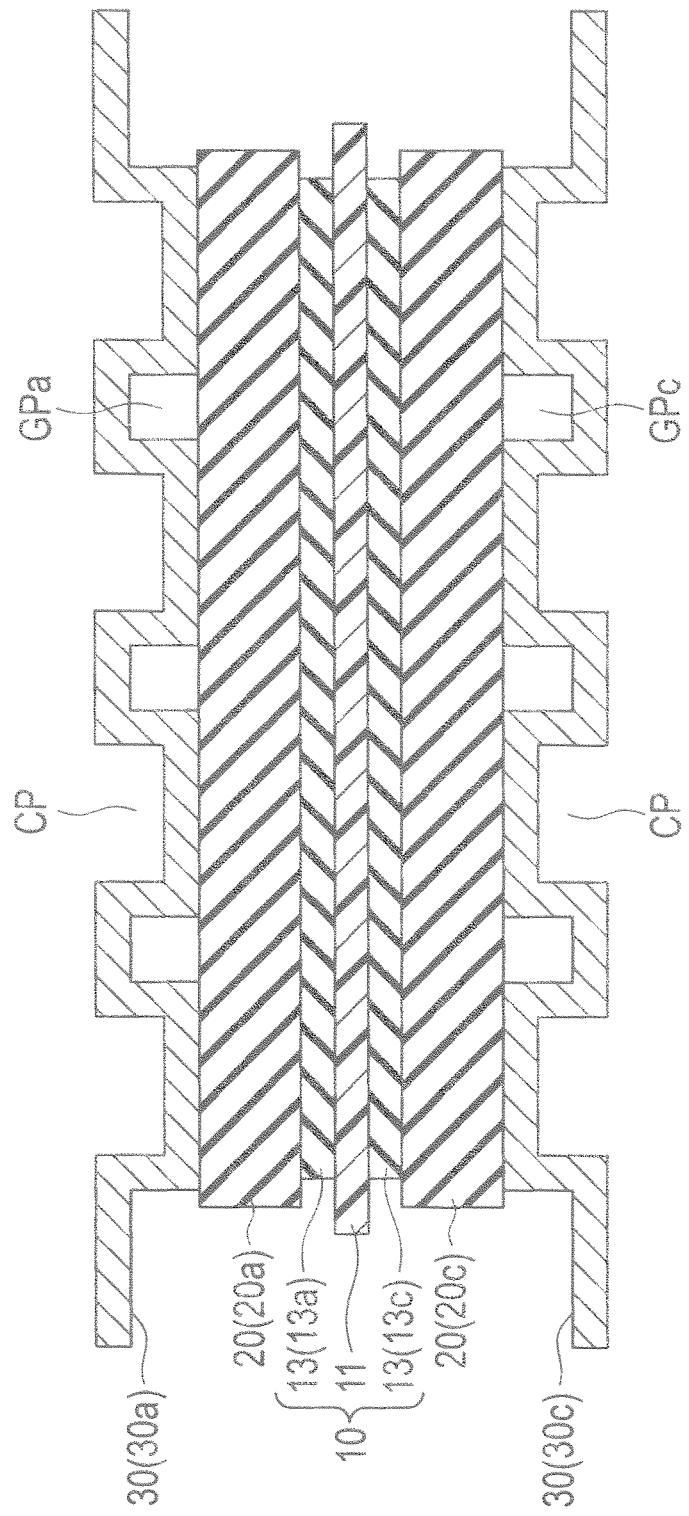
FIG. 2 is a cross-sectional view schematically showing a basic configuration of the fuel cell according to the first embodiment.
Figure 3:
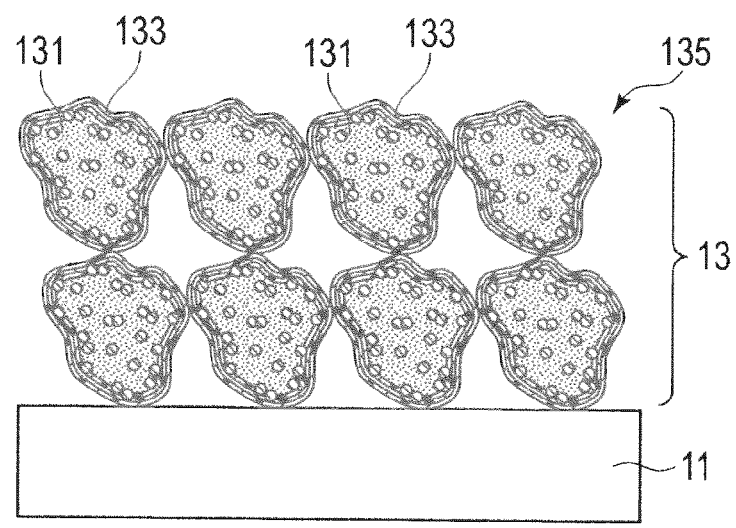
FIG. 3 is an explanatory view schematically showing an electrode catalyst layer of the fuel cell according to the first embodiment.

FIG. 1 is a perspective view showing an outline of a stack of polymer electrolyte fuel cells as a typical example of fuel cells according to a first embodiment of the present invention. Moreover, FIG. 2 is a cross-sectional view schematically showing a basic configuration of each of the polymer electrolyte fuel cells. Furthermore, FIG. 3 is an explanatory view schematically showing an electrode catalyst layer of the polymer electrolyte fuel cell. However, in FIG. 3, display of a proton-conductive material that covers a whole of a front side is omitted.

As shown in FIG. 1, in this embodiment a fuel cell (stack) 1 includes membrane electrode assemblies 10; and pairs (anodes, cathodes) of gas diffusion layers (GDLs) 20, each pair of which sandwiches the membrane electrode assembly 10 therebetween. Moreover, the fuel cell includes pairs (anodes, cathodes) of separators 30, each pair of which sandwiches the membrane electrode assembly 10 and the gas diffusion layers 20.

In the fuel cell, the membrane electrode assemblies exert a power generation, function, and the gas diffusion layers diffuse feed gas. Then, the separators separate fuel gas and oxidant gas, which, are to be supplied to the anodes and the cathodes, from each other, and in addition, electrically connect the membrane electrode assemblies, which ate adjacent to one another, to one another. The membrane electrode assemblies are stacked on and connected to one another in such a manner as described above, whereby the fuel cell is configured.

Note that, in the fuel cell, on a periphery thereof, that is, between each of the separators and a solid polymer electrolyte membrane to be described later, and between each of the membrane electrode assemblies and other membrane electrode assembly adjacent thereto, gas seal members are arranged. However, FIG. 1 and FIG. 2, illustration of the gas seal members is omitted. Moreover, in the fuel cell manifold members, which function as coupling means for coupling the respective cells to one another in an event where the stack is formed, are arranged. However, in FIG. 1, illustration of the manifold members is omitted.

As shown in FIG. 2, in this embodiment, the membrane electrode assembly 10 includes: a polymer electrolyte membrane 11; and a pair of electrode catalyst layers 13 which sandwich the same therebetween. The pair of electrode catalyst layers 13 are individually referred to as an anode electrode catalyst layer 13a and a cathode electrode catalyst layer 13c in some case. Moreover, the membrane electrode assembly 10 is sandwiched by the pair of gas diffusion layers (GDLs) 20. The pair of gas diffusion layers 20 are individually referred to as an anode gas diffusion layer 20a and a cathode gas diffusion layer 20c in some case. Furthermore, the membrane electrode assembly 10 and the gas diffusion layers 20 are sandwiched by the pair of separators 30. The pair of separators 30 are individually referred to as an anode separator 30a and a cathode separator 30c in some case.

Moreover, the separators 30 have an irregular shape as shown in FIG. 2. Protruding portions of the separators (30a, 30c) when viewed from the membrane electrode assembly 10 side are in contact with the gas diffusion layers 20. In such a way, electrical connection of the separators 30 to the membrane electrode assembly 10 is ensured. Furthermore, in a case where the separators (30a, 30c) are viewed from the membrane electrode assembly 10 side, recessed portions are formed as spaces between the separators 30 and the gas diffusion layers 20, the spaces being generated, owing to the irregular shape owned by the separators. Then, the recessed portions function as gas flow passages (GPa, GPc) for flowing gas therethrough at an operation time of the fuel cell 1.

Specifically, the fuel gas (for example, hydrogen or the like) is flown through the gas flow passages GPa of the anode separator 30a, and the oxidant gas (for example, oxygen, air or the like) is flown through the gas flow passages GPc of the cathode separator 30c. Meanwhile, recessed portions of the separators (30a, 30c) when viewed from an opposite side with the membrane electrode assembly 10 side function as coolant passages CP for flowing coolant (for example, water) for cooling a fuel cell therethrough at the operation time of the fuel cell 1. Note that, in this embodiment, one composed of only the above-described electrode catalyst layers and one composed by forming the electrode catalyst layers on the above-described gas diffusion layers are referred to as the fuel cell electrodes.

Furthermore, as shown in FIG. 3, in this embodiment, the electrode catalyst layer 13 is formed on a surface of the polymer electrolyte membrane 11, and contains an electrode catalyst 131, and a proton-conductive material 133 that coats the same. Moreover, though details will be described later, the electrode catalyst 131 is composed of a support and a particulate catalyst supported on a surface of the support. Furthermore, the proton-conductive material 133 is composed of two or more proton-conductive materials different in dry mass value per mole of a proton-donating group.

Note that, in this embodiment, in "two or more proton-conductive materials different in dry mass value per mole of the proton-donating group", there are forms in which two or more of the same type or different types of the proton-conductive material different in dry mass value per mole of the proton-donating group are included. Here, "the same type of proton-conductive materials" strands for, for example, those in which structures such as frameworks, principal chains and side chains of polymers composing the proton-conductive materials are the same, and "different types" stand for those in which the structures are not the same. Note that, even "the same type of proton-conductive materials" becomes "two or more proton-conductive materials different in dry mass value per mole of the proton-donating group" if up to a coupling position and number of such proton-donating groups are considered. Meanwhile, even "different types" of the proton-conductive materials do not sometimes become "two or more proton-conductive materials different in dry mass value per mole of the proton-donating group" if the number of such proton-donating groups is considered.

With regard to identification of the proton-conductive materials, peaks derived from the respective structures thereof just need to be analyzed, for example, by obtaining spectra, by appropriately using the nuclear magnetic resonance (NMR) for hydrogen nuclei, carbon nuclei, fluorine nuclei and the like. Moreover, for example, a technique (J. Phys. Chem. C, 2010, 114 (18), pp. 8414-4422) using carbon monoxide gas is applied, whereby an amount of anions present b a vicinity of the catalyst can be grasped quantitatively. Note that, as the anions, those (proton-conductive group) in which protons are liberated from a proton-donating group are mainly shown. Then, for example, if the quantity of anions is lower than in a case where measurement thereof is performed by only such a proton-conductive material with a relatively low dry mass value, then it can be considered that such a proton-conductive material with a high dry mass value coats at least a part of a surface of the catalyst.

Here, the dry mass value (equivalent weight: EW) per mole of the proton-donating group, is a mass of the proton-conductive material per mole of the introduced proton-donating group, and a smaller value thereof shows that a ratio of the proton-donating group in the proton-conductive material is high. Then, it is possible to measure the equivalent weight by the $^1$H—NMR spectroscopy, the elemental analysis, the acid-base titration method, and the like. However, the $^1$H—NMR spectroscopy is a preferable method from a viewpoint that it is possible to measure the equivalent weight without depending on purity of a sample.

Moreover, in this embodiment, the electrode catalyst 131 coated with the proton-conductive material 133 is sometimes referred to as a catalyzer 135. Furthermore, in this embodiment, use of the electrode catalyst layer as the cathode electrode catalyst layer is suitable since the use is highly effective; however, the electrode catalyst layer is not limited to this, and can also be used as the anode electrode catalyst layer.

Figure 4:
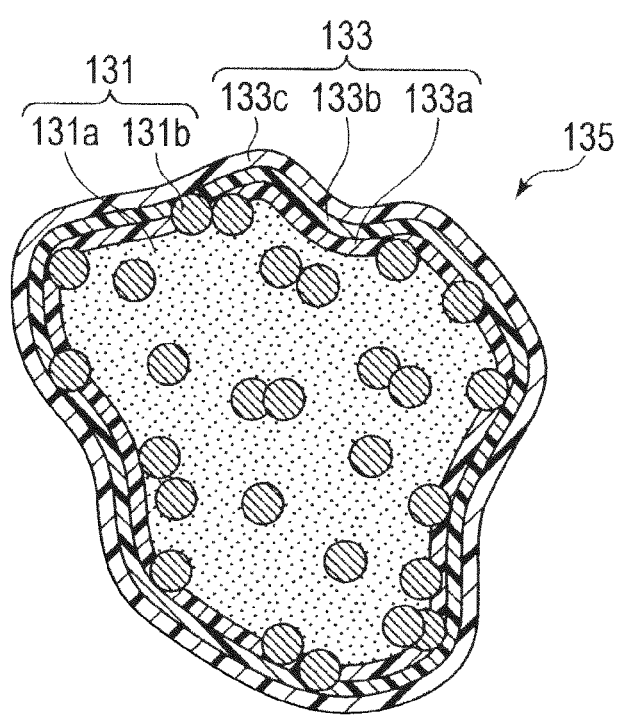
FIG. 4 is an explanatory view schematically showing a structure of a catalyzer that composes the electrode catalyst layer of the fuel cell according to the first embodiment.

FIG. 4 is an explanatory view schematically showing a structure of the catalyzer that composes the electrode catalyst layer of the fuel cell according to the first embodiment. However, display of the proton-conductive material that covers a whole of a front side is omitted.

As shown in FIG. 4, in this embodiment, the catalyzer 135 that composes the electrode catalyst layer includes: the electrode catalyst 131; and the proton-conductive material 133 that coats the same. Moreover, the electrode catalyst 131 includes: a support 131a; and a particulate catalyst 131b supported on a surface of the support 131a. Furthermore, the proton-conductive material 133 includes two or more proton-conductive materials (133a, 133b, 133c) different in dry mass value per mole of the proton-donating group. Then, the respective proton-conductive materials (133a, 133b, 133c) coat the electrode catalyst 131 while taking a whole thereof as a center, and form a three-layer structure. Note that, in this embodiment, any one of the respective proton-conductive materials (133a, 133b, 133c) is a proton-conductive material with a highest dry mass value per mole of the proton-donating group, and coats at least a part of the particulate catalyst.

As described above, in this embodiment, in the proton-conductive material 133, there are present: a portion in which a density of the proton-donating group is low; and a portion in which the density of the proton-donating group is high, and moreover, the proton-conductive material in which the dry mass value per mole of the proton-donating group is the highest in the proton-conductive materials, is brought into contact with at least a part of the catalyst. In such a way, even in a case where a supported amount of the catalyst is lowered, an electrode catalyst layer and an electrode, which are capable of realizing excellent power generation performance, are formed. Then, a membrane electrode assembly and a fuel cell, each of which includes the electrode catalyst layer and the electrode according to the present invention, can exert excellent power generation performance.

Specifically, such portions in which the density of the proton-conducting group is low are locally present on the surface of the catalyst, whereby excessive adsorption of the proton-donating group onto the surface of the catalyst is suppressed. As a result, an effective surface area of the catalyst is increased, and it becomes easy for the fuel gas and the oxidant gas to cause reactions on the surface of the catalyst, and accordingly, apparent catalytic activity will be enhanced. Furthermore, the portions in which the density of the proton-donating group is high are locally present on the surface of the catalyst, whereby proton transport properties can be enhanced.

A description is made below of the respective constituent materials in this embodiment more in detail.

<Polymer Electrolyte Membrane>

The polymer electrolyte membrane 11 has a function to selectively, permeate protons, which are generated in the anode electrode catalyst layer 13a at the operation date of the fuel cell 1, to the cathode electrode catalyst layer 13c along a membrane thickness direction. Moreover, the polymer electrolyte membrane 11 also has a function as a diaphragm for preventing mixture of the fuel gas to be supplied to the anode side and the oxidant gas to be supplied to the cathode side.

The polymer electrolyte membrane 11 is broadly classified into a fluorine-based polymer electrolyte membrane and a hydrocarbon-based polymer electrolyte membrane based on a type of ion exchange resin as a constituent material. As the ion exchange resin that composes the fluorine-based polymer electrolyte membrane, for example, there are mentioned: a perfluorocarbon sulfonic acid polymer such as NAFION, ACIPLEX (registered trademark, made by Asahi Kasei Chemicals Corporation), and FLEMION (registered trademark, made by Asahi Glass Co., Ltd.); a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer, a polyvinylidene fluoride-perfluorocarbon sulfonic acid polymer; and the like. From a viewpoint of enhancing the power generation performance such as boat resistance and chemical stability, these fluorine-based polymer electrolyte membranes are preferably used. Particularly preferably, the fluorine-based polymer electrolyte membrane composed of the perfluorocarbon sulfonic acid polymer is used.

Moreover, as the ion exchange resin that composes the hydrocarbon-based polymer electrolyte membrane, for example, there are mentioned sulfonated polyether sulfone (S-PBS), sulfonated polyaryl ether ketone, sulfonated polybenzimidazole alkyl, phosphonated polybenzimidazole alkyi, sulfonated polystyrene, sulfonated polyether ether ketone (S-PEEK), sulfonated polyphenylene (S-PPP), and the like. From manufacturing viewpoints such that raw materials are inexpensive, that manufacturing processes are simple, and that material selectivity is high, these hydrocarbon-based polymer electrolyte membranes are preferably used. Note that, with regard to the above-mentioned ion exchange resin, only one thereof may be used singly, or two or more thereof may be used in combination. Moreover, the ion exchange resin is not limited to the above-mentioned materials, and other materials can also be used.

A thickness of the polymer electrolyte membrane just needs to be appropriately decided in consideration for characteristics of the fuel cell to be obtained, and is not particularly limited. In usual, the thickness of the polymer electrolyte membrane is 5 to 300 μm. If the thickness of the polymer electrolyte membrane stays within such a numeric value range, then strength at the time of membrane production, durability at the time of usage, and a balance of output characteristics at the time of usage can be controlled appropriately.

<Electrode Catalyst Layer>

The electrode catalyst layers (anode electrode catalyst layer 13a, cathode electrode catalyst layer 13c) are layers in which battery reactions actually progress. Specifically, an oxidation reaction of hydrogen progresses in the anode electrode catalyst layer 13a, and a reduction reaction of oxygen progresses in the cathode electrode catalyst layer 13c.

(Catalyst)

Suitably, the particulate catalyst 131b for use in the anode electrode catalyst layer contains platinum. However, the catalyst is not particularly limited as long as having a catalytic function for the oxidation, reaction of hydrogen, and a catalyst heretofore known in public can be applied. Moreover, suitably, the catalyst for use in the cathode electrode catalyst layer also contains platinum. However, the catalyst is not particularly limited as long as having a catalytic function for the reduction reaction of oxygen, and a catalyst heretofore known in public can be used in a similar way.

As specific examples of the catalyst, there can be mentioned: at least erne metal selected from the group consisting, of platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga) and aluminum (Al); and mixtures, alloys and the like according to arbitrary combinations of these. In order to enhance the catalytic activity, poisoning resistance against carbon monoxide and the like, heat resistance, and the like, such a catalyst containing platinum is suitably used.

In a case where the catalyst is made of an alloy, though depending on types of metals to be formed into the alloy, a composition of the alloy is recommended to be set so that a content of the platinum can be 30 to 90 atom %, and that a content of other metal can be 10 to 70 atom %. Note that, in general, the alloy is a generic name of those having metallic property, in each of which one or more types of metal elements or non-metal elements are added to a mend element. In terms of constitutions of the alloy, there are: an eutectic alloy as a so-called mixture in which component elements become separate crystals; one in which the component elements are completely solved together to become a solid solution; one in which the component elements form an intermetallic compound or a compound of metal and non-metal; and the like, and in the present invention, any of these is employable.

Then, the catalyst for use in the anode electrode catalyst layer and the catalyst for use in the cathode electrode catalyst layer can be appropriately selected from those described above. Note that, in the present invention, unless otherwise particularly specified, definitions of both of the catalysts for the anode electrode catalyst layer and the cathode electrode catalyst layer, the catalysts having been described above, are similar to each other. Hence, the catalysts are collectively referred to as "catalyst". However, it is not necessary that the catalysts of the anode electrode catalyst layer and the cathode electrode catalyst layer be the same, and the catalysts can be appropriately selected so as to exert the desired functions as described above.

A size of the catalyst is not particularly limited, and a size similar to that of the catalyst heretofore known in public can be employed. In this event, an average particle diameter of catalyst particles is preferably 1 to 30 nm, more preferably 1 to 20 nm. If the average particle diameter of the catalyst particles stays within such a range, then a balance between easiness to carry the catalyst and a catalyst utilization ratio related to the effective electrode area in which the electrochemical reaction progresses can be appropriately controlled. Note that "average particle diameter of the catalyst particles" in the present invention can be defined as an average value of crystallite diameters obtained by full width at half maximum of diffraction peaks of the catalyst particles in X-ray diffraction or as an average value of particle diameters of the catalyst particles, which are investigated by a transmission electron microscope.

(Support)

It is preferable that the support for supporting the above-described catalyst be an electrically-conductive support. That is to say, it is preferable that the support be one that functions as an electron conduction path concerned with transfer of electrons between the catalyst and other member. However, the support is not particularly limited, and a support heretofore known in public can be used in a similar way.

The electrically-conductive support just needs to be one which has a specific surface area for supporting the catalyst particles in a desired dispersion state, and has sufficient electron conductivity, and preferably, in which a main component is carbon. Specifically, there can be mentioned: carbon black such as acetylene black, channel black, oil furnace black, gas furnace black (for example, Vulcan), lamp black, thermal black and Ketjen black; Black Pearl; graphitized acetylene black; graphitized channel black; graphitized oil furnace black; graphitized gas furnace black; graphitized lamp black; graphitized thermal black; graphitized Ketjen black; graphitized Black Pearl; carbon nanotube; carbon nanofiber; carbon nano-horn; carbon fibril; activated carbon; coke; natural graphite; artificial graphite; and the like.

Note that "main component is carbon" refers to that the electrically-conductive support contains carbon atoms as a main component, and is a concept including both of that the electrically-conductive support is composed of only the carbon atoms and that the electrically-conductive support is substantially composed of the carbon atoms. Depending on the circumstances, elements other than the carbon atoms may be contained in order to enhance the characteristics of the fuel cell. Moreover, "substantially composed of the carbon atoms" stands for that contamination of impurities with approximately 2 to 3 mass % or less can be permitted.

It is preferable that such a BET specific surface area of the electrically-conductive support be a specific surface area sufficient for supporting the catalyst particles in a highly dispersed state, and is preferably 20 to 1600 $m^2/g$, more preferably 80 to 1200 $m^2/g$. If the specific surface area of the electrically-conductive support stays within such a numeric range, then a balance between dispersibility of the catalyst and such an effective utilization ratio of the catalyst in the electrically-conductive support can be appropriately controlled. Note that, as the electrically-conductive support, one that has primary pores and one that does not have the primary pores can be used as appropriate.

A size of the electrically-conductive support is not particularly limited, either. However, from viewpoints of the easiness to carry the catalyst, the utilization ratio as the catalyst, and controlling the thickness of the electrode catalyst layer within an appropriate range, it is recommended that an average particle diameter of the electrically-conductive support be set approximately 5 to 200 nm, preferably 10 to 100 nm.

A supported concentration of the catalyst particles in the electrically-conductive support is preferably 50 to 80 mass %, more preferably 50 to 70 mass %. If the supported amount of the catalyst particles stays within such a numeric value range, then a balance between a dispersion degree of the catalyst particles on the electrically-conductive support and the catalyst performance can be appropriately controlled. Note that the supported concentration of the catalyst particles in the electrically-conductive support can be measured by the inductively coupled plasma emission spectroscopic analysis method (ICP).

(Proton-conductive Material)

As the proton-conductive material, for example, a polymer electrolyte material having the proton-donating group can be mentioned. Then, the polymer electrolyte material is broadly classified into a fluorine-based polymer electrolyte material and a hydrocarbon-based polymer electrolyte material based on a type of ion exchange resin as a constituent material.

As the ion exchange resin that composes the fluorine-based polymer electrolyte material, for example, there are mentioned: a perfluorocarbon sulfonic acid polymer such as NAFION, ACIPLEX and FLEMION; a perfluorocarbon phosphonic acid polymer; a trifluorostyrene sulfonic acid polymer; an ethylene tetrafluoroethylene-g-styrene sulfonic acid polymer; an ethylene-tetrafluoroethylene copolymer; a polyvinylidene fluoride-perfluorocarbon sulfonic acid polymer; and the like. From a viewpoint of enhancing the power generation performance such as heat resistance and chemical stability, these fluorine-based polymer electrolyte materials are preferably used, and particularly preferably; the perfluorocarbon sulfonic acid polymer is used.

Moreover, as the ion exchange resin that composes the hydrocarbon-based polymer electrolyte material, for example, there are mentioned: sulfonated polyether sulfone (S-PES), sulfonated polyaryl ether ketone; sulfonated polybenzimidazole alkyl; phosphonated polybenzimidazole alkyi, sulfonated polystyrene, sulfonated polyether ether ketone (S-PEEK), sulfonated, polyphenylene (S-PPP), and the like. From manufacturing viewpoints such that raw materials are inexpensive, that manufacturing presses are simple, and that material selectivity is high, these hydrocarbon-based polymer electrolyte material are preferably used. Note that, with regard to the above-mentioned ion exchange resin, only one thereof may be used singly, or two or more thereof may be used in combination. Moreover, the ion exchange resin is not limited to the above-mentioned materials, and other materials can also be used.

<Gas Diffusion Layer>

The gas diffusion layer (anode gas diffusion layer 20a, cathode gas diffusion layer 20c) has a function to diffuse the gas (fuel gas or oxidant gas), which is supplied to the gas flow passages (GPa, GPc) of each of the separators, to the electrode catalyst layer (13a, 13c). Moreover, the gas diffusion layer has a function as the electron conduction path.

A material that composes a substrate of the gas diffusion layer is not particularly limited, and the knowledge heretofore known in public can be referred to as appropriate. For example, there is mentioned a sheet-like material, which has conductivity and porosity, such as carbon-made woven fabric and nonwoven fabric, sheet-like paper, metal gauze or metal mesh, punching metal, and expand metal. A thickness of the substrate just needs to be appropriately decided in consideration of characteristics of the gas diffusion layer to be obtained; however, just needs to be set at approximately 30 to 500 μm. If the thickness of the substrate is a value within such a range, then it is possible to appropriately control a balance between mechanical strength and diffusibility of gas, water or the like.

It is preferable that the gas diffusion layer contain a water-repellent for the purpose of preventing a flooding phenomenon by further enhancing water repellency, and so on. The water-repellent is not particularly limited; however, a fluorine-based polymer material and an olefin-based polymer material are mentioned. As the fluorine-based polymer material, there are mentioned polytetrafluoroethylene (PTFE), polyvinylidene fluoride (PVdF), polyhexafluoropropylene (PHFP), a tetrafluoroethylene-hexafluoropropylene copolymer (TFE-HFP) and the like. Moreover, as the olefin-based polymer material polypropylene (PP), polyethylene (PE) and the like are mentioned.

Moreover, in order to further enhance the water-repellency, the gas diffusion layer may be one, in which a carbon particle layer (microporous layer; MPL, not shown) made of an aggregate of carbon particles containing a water-repellent is provided on the electrode catalyst layer side of the substrate.

The carbon particles contained in the carbon particle layer are not particularly limited, and a material heretofore known in public, such as carbon black, graphite and expanded graphite, can be appropriately employed. Among them, carbon black such as oil furnace black, channel black, lamp black, thermal black and acetylene black is preferably used since electron conductivity thereof is excellent and a specific surface area thereof is large. It is recommended that an average particle diameter of the carbon particles be set at approximately 10 to 100 nm. In such a way, high drainage by capillarity can be obtained, and in addition, it also becomes possible to enhance contact properties of the carbon particles with the electrode catalyst layer.

As the water-repellent for use in the carbon particle layer, a similar one to the above-mentioned water-repellent is mentioned. In particular, a fluorine-based polymer material is preferably used since the fluorine-based polymer material is excellent in water repellency, corrosion resistance at the time of an electrode reaction, and the like.

It is recommended that a mixture ratio of the carbon particles and the water-repellent in the carbon particle layer be set at approximately 90:10 to 40:60 (carbon particles: water-repellent) in a mass ratio in consideration of a balance between the water repellency and the electron conductivity. Note that a thickness of the carbon particle layer is not particularly limited, either, and just needs to be appropriately decided in consideration of the water repellency of the gas diffusion, layer to be obtained.

<Separator>

Each of the separators 30 is obtained, for example, in such a manner that such an irregular shape as shown in FIG. 1 is formed by implementing pressing treatment tor a thin plate with a thickness of 0.5 mm or less; however, the separator 30 is not limited to the form as described above. That is to say, for example, cutting treatment is implemented for a flat metal plate (metal substrate), whereby the irregular shape that composes the gas flow passages and the coolant flow passages may be formed.

A material that composes the separator is not particularly limited; and a material heretofore known in public can be applied. It is preferable that the material be a material, which it is difficult for the supplied gas to permeate, and it is preferable that the material be a material, through which it is easy for a current taken out by the battery reaction to flow. Specifically, there are mentioned: a metal material such as iron, titanium, aluminum, and alloys of these; a metal material in which the corrosion resistance is enhanced by forming a coating film of a carbon material or the like thereon; a polymer material (electrically-conductive plastics) to which the conductivity is imparted by the metal material, the carbon material or the like. Note that stainless steel is included in an iron alloy. Each of these may be a single layer one or one having a laminated structure of two or more layers.

[Second Embodiment]

Figure 5:
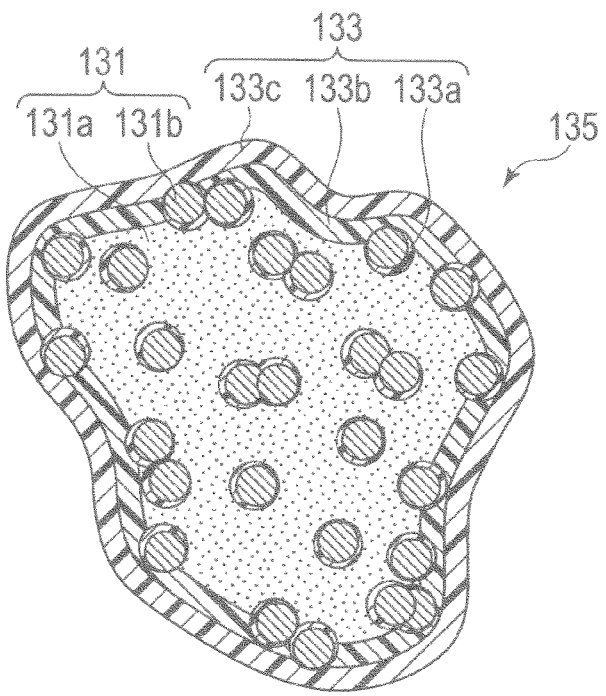
FIG. 5 is an explanatory view schematically showing a structure of a catalyzer that composes an electrode catalyst layer of a fuel cell according to a second embodiment.

FIG. 5 is an explanatory view schematically showing a structure of a catalyzer that composes an electrode catalyst layer of a fuel cell according to a second embodiment. However, display of a proton-conductive material that covers a whole of a front side is omitted. Note that, with regard to components equivalent to those described in the first embodiment, the same reference numerals as those of these are assigned thereto, and a description thereof is omitted.

As shown in FIG. 5, in this embodiment, a coating form of each of the proton-conductive materials is different from that of the first embodiment. That is to say, in this embodiment the proton-conductive material 133a coats the particulate catalyst 131b while taking the same as a center, and further, the other proton-conductive materials (133b, 133c) coat the electrode catalyst 131 while taking a whole thereof as a center. Note that in this embodiment, any one of the respective proton-conductive materials (133a, 133b, 133c) is the proton-conductive material with the highest dry mass value per mole of the proton-donating group, and coats at least a part of the particulate catalyst.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, the electrode catalyst layer and the electrode, which are capable of realizing the excellent power generation performance, are formed. Then, the membrane electrode assembly and the fuel cell, each of which includes the electrode catalyst layer and the electrode according to the present invention, can exert the excellent power generation performance. In other words, the portions in which the density of the proton-donating group is low are locally present, whereby the effective surface area of the catalyst is increased. That is to say, the apparent catalytic activity will be enhanced. Moreover, the portions in which the density of the proton-donating group is high are locally present, whereby the proton transport properties are maintained.

[Third Embodiment]

Figure 6:
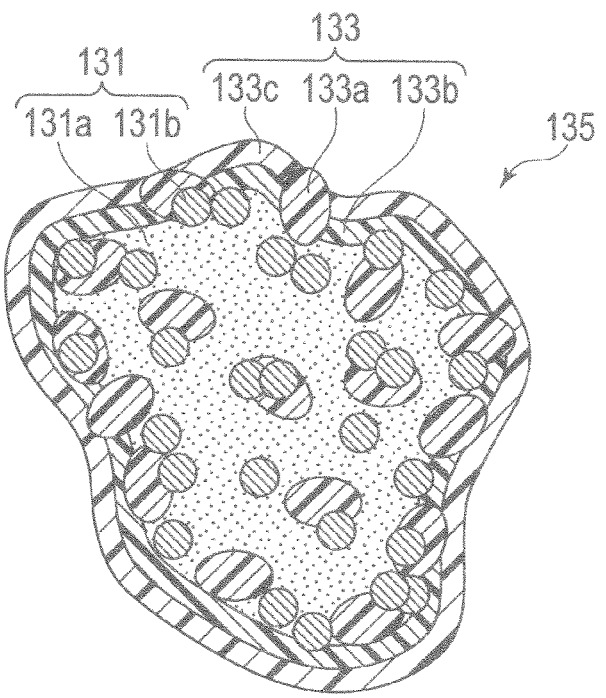
FIG. 6 is an explanatory view schematically showing a structure of a catalyzer that composes an electrode catalyst layer of a fuel cell according to a third embodiment.

FIG. 6 is an explanatory view schematically showing a structure of a catalyzer that composes an electrode catalyst layer of a fuel cell according to a third embodiment. However, display of a proton-conductive material that covers a whole of a front side is omitted. Note that, with regard to components equivalent to those described in the first and second embodiments, the same reference numerals as those of these are assigned thereto, and a description thereof is omitted.

As shown in FIG. 6, in this embodiment, a coating form of each of the proton-conductive materials is different from those of the first and second embodiments. That is to say, in this embodiment, the proton-conductive material 133a randomly coats a periphery of the electrode catalyst 131, and further, the other proton-conductive materials (133b, 133c) coat the electrode catalyst 131 while taking the whole thereof as a center. Note that, in this embodiment, any one of the respective proton-conductive materials (133a, 133b, 133c) is the proton-conductive material with the highest dry mass value per mole of the proton-donating group, and coats at least a part of the particulate catalyst.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, the electrode catalyst layer and the electrode, which are capable of realizing the excellent power generation performance, are formed. Then, the membrane electrode assembly and the fuel cell, each of which includes the electrode catalyst layer and the electrode according to the present invention, can exert the excellent power generation performance. In other words, the portions in which the density of the proton-donating group is low are locally present, whereby the effective surface area of the catalyst is increased. That is to say, the apparent catalytic activity will be enhanced. Moreover, the portions in which the density of the proton-donating group is high are locally present, whereby the proton transport properties are maintained.

[Fourth Embodiment]

Figure 7:
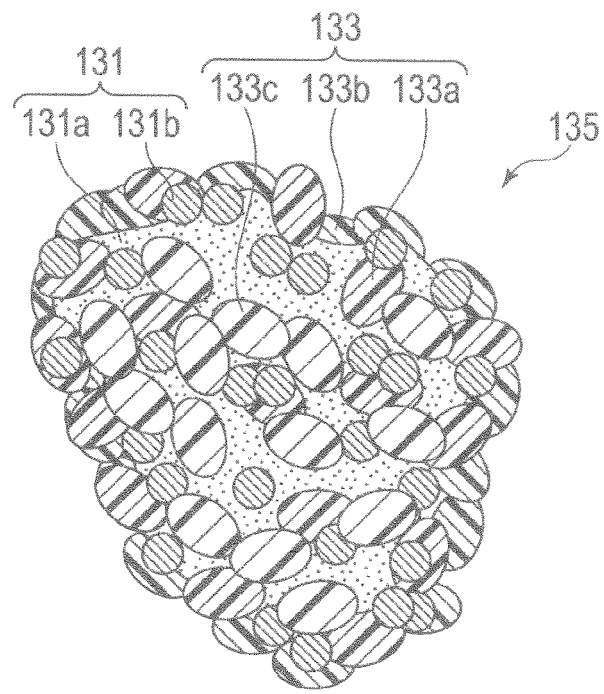
FIG. 7 is an explanatory view schematically showing a structure of a catalyzer that composes air electrode catalyst layer of a fuel cell according to a fourth embodiment.

FIG. 7 is an explanatory view schematically showing a structure of a catalyzer that composes an electrode catalyst layer of a fuel cell according to a fourth embodiment. However, display of a proton-conductive material that covers a whole of a front side is omitted. Note that, with regard to components equivalent to those described in the first to third embodiments, the same reference numerals as those of these are assigned thereto, and a description thereof is omitted.

As shown in FIG. 7, in this embodiment, a coating form of each of the proton-conductive materials is different from those of the first to third embodiments. That is to say, in this embodiment, the proton-conductive materials (133*a*, 133*b*, 133*c*) randomly coat the periphery of the electrode catalyst 131. Note that, in this embodiment, any one of the respective proton-conductive materials (133*a*, 133*b*, 133*c*) is the proton-conductive material with the highest dry mass value per mole of the proton-donating group, and coats at least a part of the particulate catalyst.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, the electrode catalyst layer and the electrode, which are capable of realizing the excellent power generation performance, are formed. Then, the membrane electrode assembly and the fuel cell, each of which includes the electrode catalyst layer and the electrode according to the present invention, can exert the excellent power generation performance. In other words, the portions in which the density of the proton-donating group is low are locally present, whereby the effective surface area of the catalyst is increased. That is to say, the apparent catalytic activity will be enhanced. Moreover, the portions in which the density of the proton-donating group is high are locally present, whereby the proton transport properties are maintained.

[Fifth Embodiment]

Figure 8:
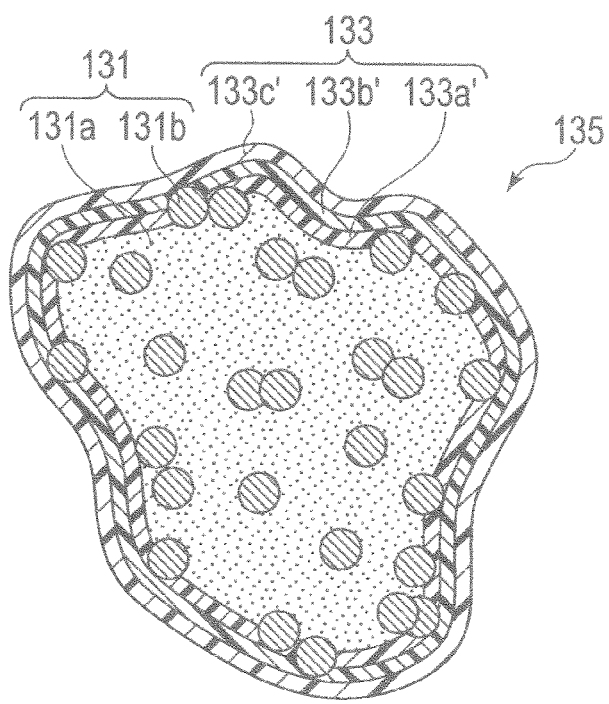
FIG. 8 is an explanatory view schematically showing a structure of a catalyzer that composes an electrode catalyst layer of a fuel cell according to a fifth embodiment.

FIG. 8 is an explanatory view schematically showing a structure of a catalyzer that composes an electrode catalyst layer of a fuel cell according to a fifth embodiment. However, display of a proton-conductive material that covers a whole of a front side is omitted. Note that, with regard to components equivalent to those described in the first to fourth embodiments, the same reference numerals as those of these are assigned thereto, and a description thereof is omitted.

As shown in FIG. 8, in this embodiment, an aspect of a part of the proton-conductive materials is different from that of the first embodiment. That is to say, in this embodiment, it is a proton-conductive material 133*a*' that is the proton-conductive material in which the dry mass value per mole of the proton-donating group is the highest in the respective proton-conductive materials (133*a*', 133*b*', 133*c*'), and the proton-conductive material 133*a*' coats at least a part of the particulate catalyst. Note that, in this embodiment such a configuration, in which the respective proton-conductive materials (133*a*', 133*b*', 133*c*') coat the electrode catalyst 131 while taking the whole thereof as a center, and form the three-layer structure, is the same as that of the first embodiment.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, the electrode catalyst layer and the electrode, which are capable of realizing the excellent power generation performance, are formed. Then, the membrane electrode assembly and the fuel cell each of which includes the electrode catalyst layer and the electrode according to the present invention, can exert more excellent power generation performance. In other words, the portions in which the density of the proton-donating group is low are locally present in the vicinity of the catalyst, whereby the effective surface area of the catalyst is increased. That is to say, the apparent catalytic activity will be enhanced. Moreover, the portions in which the density of the proton-donating group is high are locally present, whereby the proton transport properties are maintained.

[Sixth Embodiment]

Figure 9:
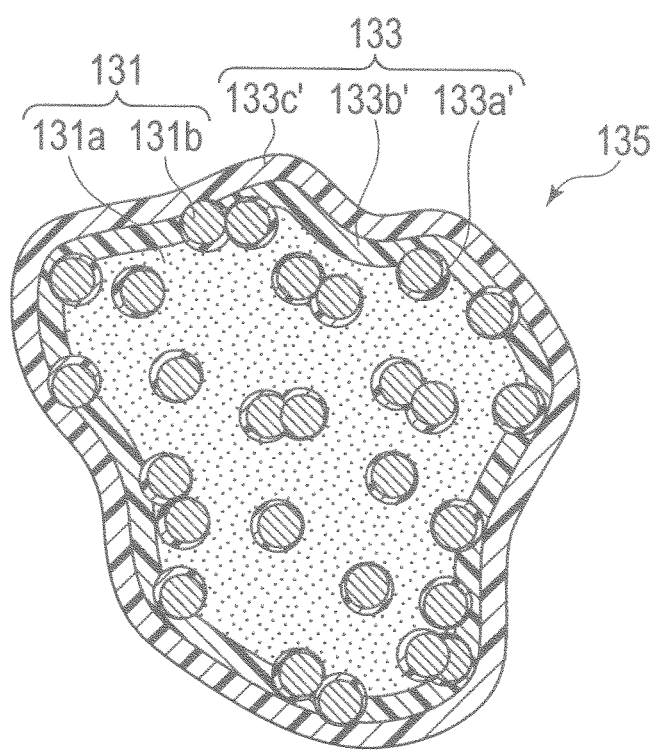
FIG. 9 is an explanatory view schematically showing a structure of a catalyzer That composes an electrode catalyst layer of a fuel cell according to a sixth embodiment.

FIG. 9 is an explanatory view schematically showing a structure of a catalyzer that composes an electrode catalyst layer of a fuel cell according to a sixth embodiment However, display of a proton-conductive material that covers a whole of a front side is Omitted. Note that, with regard to components equivalent to those described in the first to fifth embodiments, the same reference numerals as those of these are assigned thereto, and a description thereof is omitted.

As shown in FIG. 9, in this embodiment, an aspect of a part of the proton-conductive materials is different from that of the second embodiment. That is to say, in this embodiment, it is the proton-conductive material 133*a*' that is the proton-conductive material, in which the dry mass value per mole of the proton-donating group is the highest in the respective proton-conductive materials (133*a*', 133*b*', 133*c*'), and the proton-conductive material 133*a*' coats at least a part of the particulate catalyst. Note that, in this embodiment, such a configuration, in which the proton-conductive material 133*a*' coats the particulate catalyst 131*b* of the electrode catalyst 131 while taking the same as a center, and further, the other proton-conductive materials (133*b*', 133*c*') coat the electrode catalyst 131 while taking the whole thereof as a center, is the same as that of the second embodiment.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, an electrode catalyst layer and an electrode, which are capable of realizing the more excellent power generation performance, are formed. Then, the membrane electrode assembly and the fuel cell, each of which includes the electrode catalyst layer and the electrode according to the present invention, can exert the more excellent power generation performance. In other words, the portions in which the density of the proton-donating group is low are locally present in the vicinity of the catalyst, whereby the effective surface area of the catalyst is increased. That is to say, the apparent catalytic activity will be enhanced. Moreover, the portions in which the density of the proton-donating group is high are locally present, whereby the proton transport properties are maintained.

[Seventh Embodiment]

FIG. 10(*a*) is an explanatory view schematically showing a structure of a catalyst that composes an electrode catalyst layer of a fuel cell according to a seventh embodiment. Moreover, FIGS. 10(*b*) and 10(*c*) are explanatory views enlargedly showing peripheries of a catalyst particle in the catalyzer of FIG. 10(*a*). However, in FIG. 10(*a*), display of a proton-conductive material that covers a whole of a front side is omitted. Note that, with regard to components equivalent to those described in the first to sixth embodiments, the same reference numerals as those of these are assigned thereto, and a description thereof is omitted.

As shown in FIGS. 10(*a*) to 10(*c*), in this embodiment, an aspect of a part of the proton-conductive materials is different from that of the second embodiment. That is to say, in this embodiment, it is the proton-conductive material 133*a*' that is the proton-conductive material, in which the dry mass value per mole of the proton-donating group is the highest in the respective proton-conductive materials (133*a*', 133*b*', 133*c*'), and the proton-conductive material 133*a*' coats at least a part of the particulate catalyst. Furthermore, a contact ratio of the proton-conductive material 133*a*' with the particulate catalyst is largest. Note that FIG. 10(*b*) is a view showing a state where a part of the particulate catalyst is coated with the proton-conductive material 133*a*'. Moreover, FIG. 10(*c*) is a view showing a state where substantially the whole of the particulate catalyst is coated with the proton-conductive material 133*a*'.

Note that, in this embodiment, such a configuration, in which the respective proton-conductive materials (133*a*', 133*b*', 133*c*') coat the electrode catalyst 131 while taking the whole thereof as a center, and form the three-layer structure, is the same as that of the first embodiment. Moreover, such a configuration, in which the proton-conductive material 133*a*' coats the particulate catalyst 131*b* of the electrode catalyst 131 while taking the same as a center, and further, the other proton-conductive materials (133*b*', 133*c*') coat the electrode catalyst 131 while taking the whole thereof as a center, is also the same as that of the first embodiment.

As described above, a configuration is made, in which there are present: the portion in which the density of the proton-donating group is low; and the portion in which the density of the proton-donating group is high, and the proton-conductive material, in which the dry mass value per mole of the proton-donating group is the highest in the proton-conductive materials, is brought into contact with at least a part of the catalyst. In such a way, even in the case where the supported amount of the catalyst is lowered, an electrode catalyst layer and an electrode, which are capable of realizing the more excellent power generation performance, are formed. Then, the membrane electrode assembly and the fuel cell, each of which includes the electrode catalyst layer and the electrode according to the present invention, can exert the more excellent power generation performance. The portions in which the density of the proton-conducting group is low are locally present in the vicinity of the catalyst to a large extent, whereby the effective surface area of the catalyst is further increased, that is, the apparent catalytic activity will be enhanced. Moreover, the portions in which the density of the proton-donating group is high are locally present whereby the proton transport properties are maintained.

[Eighth Embodiment]

Figure 11:
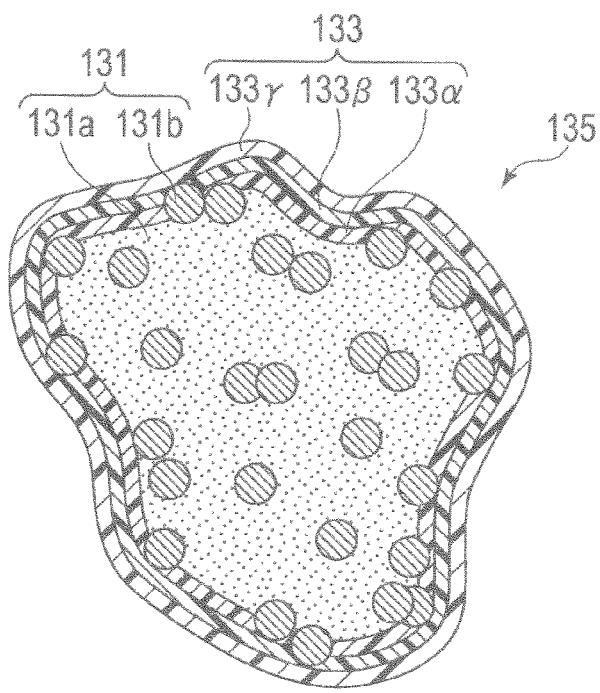
FIG. 11 is an explanatory view schematically showing a structure of a catalyzer that composes an electrode catalyst layer of a fuel cell according to an eighth embodiment.

FIG. 11 is an explanatory view schematically showing a structure of a catalyzer that composes an electrode catalyst layer of a fuel cell according to an eighth embodiment. However, display of a proton-conductive material that covers a whole of a front side is omitted. Note that, with regard to components equivalent to those described in the first to seventh embodiments, the same reference numerals as those of these are assigned thereto, and a description thereof is omitted.

As shown in FIG. 11, in this embodiment, an aspect of a part of the Proton-conductive materials is different from that of the first embodiment. That is to say, in this embodiment, a dry mass value per mole of a sulfonic acid group of at least one of the respective proton-conductive materials (133α, 133β, 133γ) in each of which a proton-donating group is the sulfonic acid group is 1200 or more. Preferably, the proton-donating group is the sulfonic acid group, and a dry mass value per mole of the sulfonic acid group of the proton-conductive material 133α with the highest dry mass value per mole of the sulfonic acid group is 1200 or more. Note that, in this embodiment, the configuration, in which the respective proton-conductive materials (133α, 133β, 133γ) coat the electrode catalyst 131 while taking the same as a center, and form the three-layer structure, is the same.

A configuration is made, in which there are present: a portion in which a density of the sulfonic acid group is so low that the dry mass value per mole of the sulfonic acid group is 1200 or more; and a portion in which the density of the sulfonic acid group is high, and in such a way, even in the case where the supported amount of the catalyst is lowered, an electrode catalyst layer and an electrode, which are capable of realizing the more excellent power generation performance, are formed. Then, the membrane electrode assembly and the fuel cell, each of which includes the electrode catalyst layer and the electrode according to the present invention, can exert the more excellent power generation performance. In other words, such portions in which the density of the sulfonic acid group is so low that the dry mass value per mole of the sulfonic acid group is 1200 or more are locally present in the vicinity of the catalyst to a large extent, whereby the sulfonic acid group can be suppressed from being adsorbed to the catalyst such as platinum. Then, the effective surface area of the catalyst is further increased. That is to say, the apparent catalytic activity will be further enhanced. Moreover, the portions in which the density of the proton-donating group is high are locally present, whereby the proton transport properties are maintained.

[Ninth Embodiment]

Figure 12:
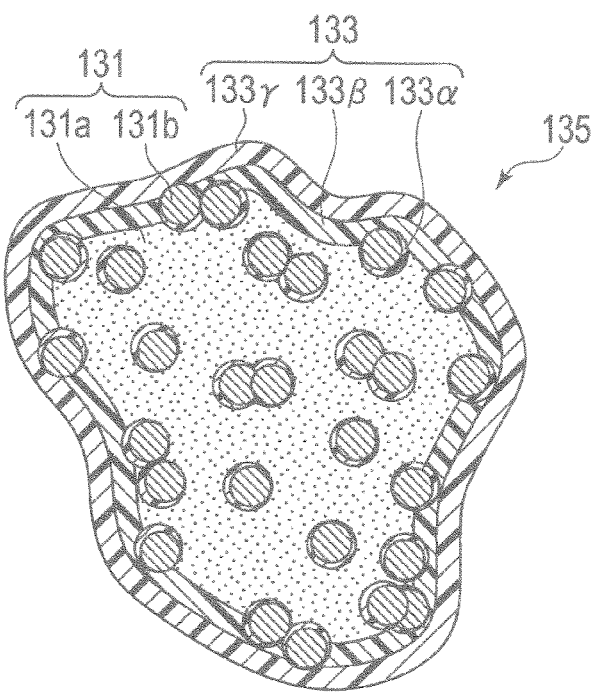
FIG. 12 is an explanatory view schematically showing a structure of a catalyzer that composes an electrode catalyst layer of a fuel cell according to a ninth embodiment.

FIG. 12 is an explanatory view schematically allowing a structure of a catalyzer that composes an electrode catalyst layer of a fuel cell according to a ninth embodiment. However, display of a proton-conductive material that covers a whole of a front side is omitted. Note that, with regard to components equivalent to those described in the first to eighth embodiments, the same reference numerals as those of these are assigned thereto, and a description thereof is omitted.

As shown in FIG. 12, in this embodiment, an aspect of a part of the proton-conductive materials is different from that of the second embodiment. That is to say, in this embodiment, the dry mass value per mole of the sulfonic acid group of at least one of the respective proton-conductive materials (133α, 133β, 133γ) in each of which the proton-donating group is the sulfonic acid group is 1200 or more. Then, preferably, the proton-donating group is the sulfonic acid group, and the dry mass value per mole of the sulfonic acid group of the proton-conductive material 133α with the highest dry mass value per mole of the sulfonic acid group is 1200 or more. Note that, in this embodiment, the configuration, in which the proton-conductive material 133α coats particulate catalyst 131b of the electrode catalyst 131 while taking the same as a center, and further, the other proton-conductive materials (133β, 133γ) coat the electrode catalyst 131 while taking the whole thereof as a center, is the same as that of the second embodiment.

A configuration is made, in which there are present: the portion in which the density of the sulfonic acid group is so low that the dry mass value per mole of the sulfonic acid group is 1200 or more; and the portion in which the density of the sulfonic acid group is high, and in such a way, even in the case where the supported amount of the catalyst is lowered, an electrode catalyst layer and an electrode, which are capable of realizing the more excellent power generation performance, are formed. Then, the membrane electrode assembly and the fuel cell each of which includes the electrode catalyst layer and the electrode according to the present invention, can exert the more excellent power generation performance. The portions in which the density of the sulfonic acid group is so low that the dry mass value per mole of the sulfonic acid group is 1200 or more are locally present in the vicinity of the catalyst to a large extent, whereby it becomes possible to suppress the sulfonic acid group from being adsorbed to the catalyst such as platinum. Then, the effective surface area of the catalyst is further increased, that is, the apparent catalytic activity will be further enhanced. Moreover, the portions in which the density of the proton-donating group is high are locally present, whereby the proton transport properties are maintained.

[Tenth Embodiment]

Figure 13:
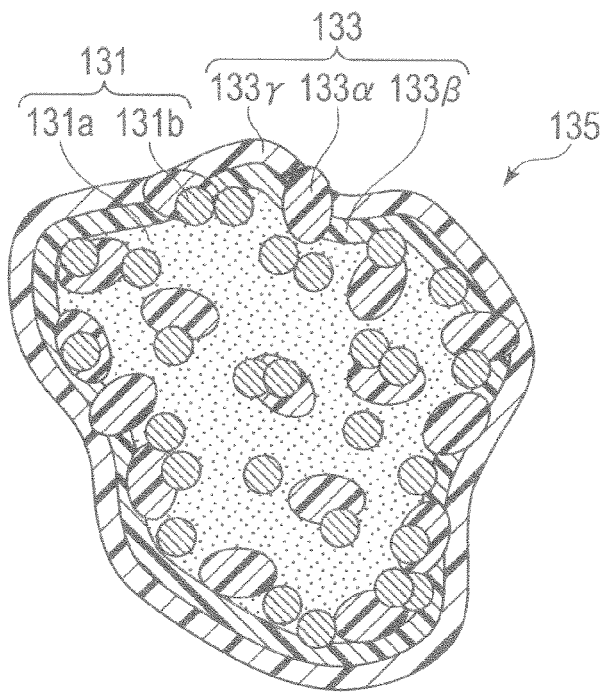
FIG. 13 is an explanatory view schematically showing a structure of a catalyzer that composes an electrode catalyst layer of a fuel cell according a tenth embodiment.

FIG. 13 is an explanatory view schematically showing a structure of a catalyzer that composes an electrode catalyst layer of a fuel cell according to a tenth embodiment. However, display of a proton-conductive material that covers a whole of a front side is omitted. Note that, with regard to components equivalent to those described in the first to ninth embodiments, the same reference numerals as those of these are assigned thereto, and a description thereof is omitted.

As shown in FIG. 13, in this embodiment, an aspect of a part of the proton-conductive materials is different from that of the third embodiment. That is to say, in this embodiment, the dry mass value per mole of the sulfonic acid group of at least one of the respective proton-conductive materials (133α, 133β, 133γ) in each of which the proton-donating group is the sulfonic acid group is 1200 or more. More preferably, the proton-donating group is the sulfonic acid group, and the dry mass value per mole of the sulfonic acid group of the proton-conductive material 133α with the highest dry mass value per mole of the sulfonic acid group is 1200 or more. Note that, in this embodiment, the configuration, in which the proton-conductive material 133α randomly coats the periphery of the electrode catalyst 131, and further, the other proton-conductive materials (133β, 133γ) coat the electrode catalyst 131 while taking the whole thereof as a center, is the same.

A configuration is made, in which there are present: the portion in which the density of the sulfonic acid group is so low that the dry mass value pet mole of the sulfonic acid group is 1200 or more; and the portion in which the density of the sulfonic acid group is high, and in such a way, even in the case where the supported amount of the catalyst is lowered, an electrode catalyst layer and an electrode, which am capable of realizing the more excellent power generation performance, are formed. Then, the membrane electrode assembly and the fuel cell, each of which includes the electrode catalyst layer and the electrode according to the present invention, can exert the more excellent power generation performance. In other words, such portions in which the density of the sulfonic acid group is so low that the dry mass value per mole of the sulfonic acid group is 1200 or more are locally present in the vicinity of the catalyst to a large extent, whereby the sulfonic acid group can be suppressed from being adsorbed to the catalyst such as platinum. Then, the effective surface area of the catalyst is further increased. That is to say, the apparent catalytic activity will be further enhanced. Moreover, the portions in which the density of the proton-donating group is high are locally present, whereby the proton transport properties are maintained.

[Eleventh Embodiment]

Figure 14:
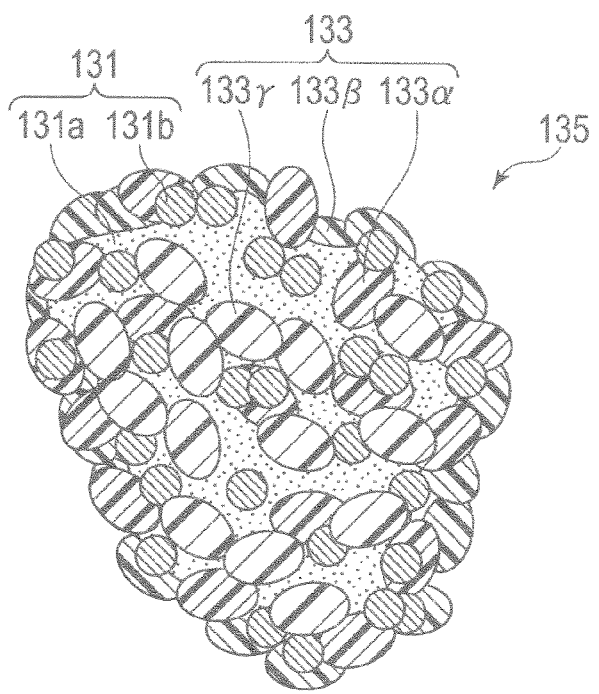
FIG. 14 is an explanatory view schematically showing a structure of a catalyzer that composes an electrode catalyst layer of a fuel cell according to an eleventh embodiment.

FIG. 14 is an explanatory view schematically showing a structure of a catalyzer that composes an electrode catalyst layer of a fuel cell according to an eleventh embodiment. However, display of a proton-conductive material that covers a whole of a front side is omitted. Note that, with regard to components equivalent to those described in the first to tenth embodiments, the same reference numerals as those of these are assigned thereto, and a description thereof is omitted.

As shown in FIG. 14, in this embodiment, an aspect of a part of the proton-conductive materials is different from that of the fourth embodiment. That is to say, in this embodiment, the dry mass value per mole of the sulfonic acid group of at least one of the respective proton-conductive materials (133α, 133β, 133γ) in each of which the proton-donating group is the sulfonic acid group is 1200 or more. Note that, in this embodiment, the configuration, in which the proton-conductive materials (133α, 133β, 133γ) randomly coat the periphery of the electrode catalyst 131, is the same.

A configuration is made, in which there are present the portion in which the density of the sulfonic acid group is so low that the dry mass value per mole of the sulfonic acid group is 1200 or more; and the portion in which the density of the sulfonic acid group is high, and in such a way, even in the case where the supported amount of the catalyst is lowered, an electrode catalyst layer and an electrode, which are capable of realizing the more excellent power generation performance, are formed. Then, the membrane electrode assembly and the fuel cell, each of which includes the electrode catalyst layer and the electrode according to the present invention, can exert the more excellent power generation performance. The portions in which the density of the sulfonic acid group is so low that the dry mass value per mole of the sulfonic acid group is 1200 or more are locally present in the vicinity of the catalyst to a large extent, whereby it becomes possible to suppress the sulfonic acid group from being adsorbed to the catalyst such as platinum. Then, the effective surface area of the catalyst is further increased, that is, the apparent catalytic activity will be further enhanced. Moreover, the portions in which the density of the proton-donating group is high are locally present, whereby the proton transport properties are maintained.

[Twelfth Embodiment]

FIGS. 15(*a*) and 15(*b*) are explanatory views enlargedly showing a structure of a catalyzer that composes an electrode catalyst layer of a fuel cell according to a twelfth embodiment. Note that, with regard to components equivalent to those described in the first to eleventh embodiments, the same reference numerals as those of these are assigned thereto, and a description thereof is omitted.

As shown in FIGS. 15(*a*) and 15(*b*), in this embodiment, an aspect and coating form of a part of the proton-conductive materials is different from those of the first embodiment that is to say, in this embodiment, it is the proton-conductive material 133*a* that is the proton-conductive material, in which the dry mass value per mole of the proton-donating group is the highest in the respective proton-conductive materials (133*a*, 133*b*, 133*c*), and the proton-conductive material 133*a* coats at least a part of the particulate catalyst. Furthermore, a ratio of the proton-conductive material 133*a* with respect to the support is 0.5 or less in a mass ratio.

Moreover, in this embodiment, preferably, the proton-donating group is the sulfonic acid group, and further, the dry mass value per mole of the sulfonic acid group of the proton-conductive material 133*a* with the highest dry mass value per mole of the sulfonic acid group is 1200 or more. Note that FIG. 15(*a*) is a view showing a state where the ratio (proton-conductive material/support) of the proton-conductive material with the highest dry mass value per mole of the sulfonic acid group with respect to the support is 0.5 in the mass ratio. Moreover, FIG. 15(*b*) is a view showing a state where the ratio (proton-conductive material/support) of the proton-conductive material with the highest dry mass value per mole of the sulfonic acid group with respect to the support is 0.01 in the mass ratio.

Moreover, in an embodiment of FIG. 15(*a*), the respective proton-conductive materials (133*a*, 133*b*, 133*c*) coat the electrode catalyst 131 while taking the whole thereof as a center, and form a three-layer structure. Furthermore, in an embodiment of FIG. 15(*b*), the proton-conductive material 133*a* coats the particulate catalyst 131*b* while taking the same as a center, and further, the other proton-conductive materials (133*b*, 133*c*) coat the electrode catalyst 131 while taking a whole thereof as a center.

In this embodiment, in an event of making the configuration in which the portion with a low density of the proton-donating group and the portion with a high density of the proton-donating group are present, the ratio, with respect to the support, of the portion in which the density of the sulfonic acid group is so low that the dry mass value per mole of the sulfonic acid group is 1200 or more is set at 0.5 or less in the mass ratio. In such a way, even in the case where the supported amount of the catalyst is lowered, an electrode catalyst layer and an electrode, which can suppress a resistance loss, and are capable of realizing further excellent power generation performance, are formed. Then, the membrane electrode assembly and the fuel cell, each of which includes the electrode catalyst layer and the electrode according to the present invention, can exert further excellent power generation performance.

Here, in the proton-conductive material, for example, as the dry mass value per mole of the sulfonic acid group is higher, proton transport resistance is increased, and accordingly, it is preferable to approximate a usage amount thereof to a minimum possible (to an extend where the catalyst can be coated). Therefore, the portion with the low density of the proton-donating group (for example, the sulfonic acid group) is locally present only in the vicinity of the catalyst, whereby the effective surface area of the catalyst is further increased. That is to say, the apparent catalytic activity will be enhanced. Moreover, the portions in which the density of the proton-donating group is high are locally present to a large extent, whereby the proton transport properties are maintained.

[Thirteenth Embodiment]

Figure 16:
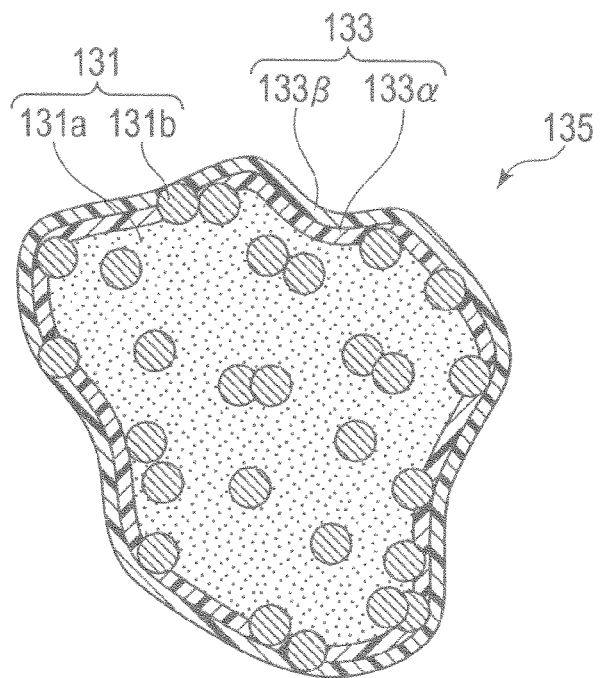
FIG. 16 is an explanatory view schematically showing a structure of a catalyzer that composes an electrode catalyst layer of a fuel cell according to a thirteenth embodiment.

FIG. 16 is an explanatory view schematically showing a structure of a catalyzer that composes an electrode catalyst layer of a fuel cell according to a thirteenth embodiment. However, display of a proton-conductive material that covers a whole of a front side is omitted. Note that, with regard to components equivalent to those described in the first to twelfth embodiments, the same reference numerals as those of these are assigned thereto, and a description thereof is omitted.

As shown in FIG. 16, in this embodiment, the catalyzer 135 that composes the electrode catalyst layer includes: the electrode catalyst 131; and the proton-conductive material 133 that coats the same. Moreover, the electrode catalyst 131 includes: the support 131*a*; and the particulate catalyst 131*b* supported on the surface of the support 131*a*. Furthermore, the proton-conductive material 133 includes two or more proton-conductive materials different in dry mass value per mole of the sulfonic acid group. Here, in the proton-conductive material 133α, a dry mass value thereof per mole of the sulfonic acid group is 1200 or more. Moreover, in the proton-conductive material 133β, a dry mass value thereof per mole of the sulfonic acid group is 700 or less. Then, the respective proton-conductive materials (133α, 133β) coat the electrode catalyst 131 while taking a whole thereof as a center, and form a two-layer structure.

Figure 17:
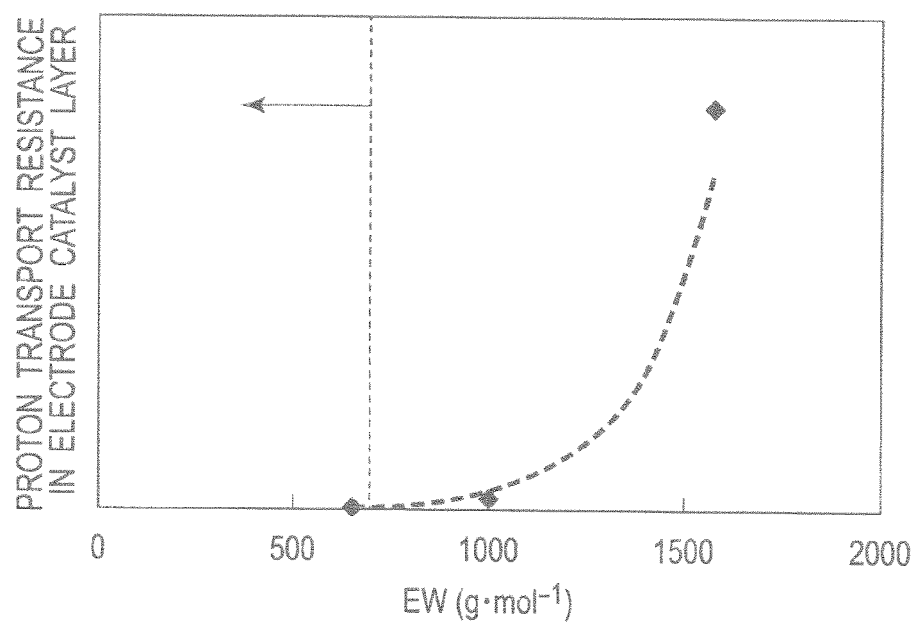
FIG. 17 is a graph showing a relationship between a dry mass value (EW) per mole of a sulfonic acid group and a proton transport resistance in the electrode catalyst layer.

FIG. 17 is a graph between the dry mass value (EW) per mole of the sulfonic acid group and the proton transport resistance is the electrode catalyst layer. As shown in FIG. 17, if the dry mass value (EW) per mole of the sulfonic acid group is 700 or less, then the proton transport resistance in the electrode catalyst layer almost disappears. Therefore, proton transport properties in a portion where the dry mass value (EW) is relatively low can be enhanced.

In this embodiment, there are present: the portion in which the density of the sulfonic acid group is so low that the dry mass value per mole of the sulfonic acid group is 1200 or more; and such a portion in which the density of the sulfonic acid group is so high that the dry mass value per mole of the sulfonic acid group is 700 or less. In accordance with such a configuration, even in the case where the supported amount of the catalyst is lowered, an electrode catalyst layer and an electrode, which can suppress the resistance loss, and are capable of realizing the further excellent power generation performance, are formed. Then, the membrane electrode assembly and the fuel cell, each of which includes the electrode catalyst layer and the electrode according to the present invention, can exert the further excellent power generation performance.

Here, the proton-conductive material in which the density of the sulfonic acid group is so low that the dry mass value per mole of the sulfonic acid group is 1200 or more is locally present in the vicinity of the catalyst to a large extent, whereby the sulfonic acid group can be suppressed from being adsorbed to the catalyst such as platinum. Then, the effective surface area of the catalyst is further increased. That is to say, the apparent catalytic activity will be further enhanced. Moreover, the proton-conductive material in which the density of the sulfonic acid, group is so high that the dry mass value per mole of the sulfonic acid group is 700 or less is locally present to a large extent, whereby the proton transport properties will be enhanced.

[Fourteenth Embodiment]

In each of the above-described embodiments, it is preferable that the contact ratio (θ) of the proton-conductive material in the support, the contact ratio being represented in the following Expression (1), be 0.4 or more.

Such a configuration is employed, whereby, even in the case where the supported amount of the catalyst is lowered, the electrode catalyst layer and the electrode, which are capable of realizing the excellent power generation performance, are formed. Then, the membrane electrode assembly and the fuel cell, each of which includes the electrode catalyst layer and the electrode according to the present invention, can exert the excellent power generation performance. In other words, if the contact ratio as described above is set, then a proton donating distance from the proton-conductive material, for example, to the surface of the platinum can be shortened, and accordingly, the proton transport properties can be enhanced.

$$\theta = (C_{dl\_30\%})/(C_{dl\_100\%}) \qquad (1)$$

(where "$C_{dl\_30\%}$" is an electrical double layer capacitance at relative humidity of 30%, and "$C_{dl\_100\%}$" is an electrical double layer capacitance at relative humidity of 100%.)

Here, the ratio (θ[/]) represented by the above-described Expression (1) can be measured by using the membrane electrode assembly including the electrode catalyst layer formed as the mixture that at least contains the support and the proton-conductive material. Specifically, first, artificial electrode catalyst layer and membrane electrode assembly are fabricated by using a support that does not contain the catalyst particles. Then, an electrical doable layer capacitance (Cdl) of the obtained, membrane electrode assembly is measured in a case where relative humidity (RH) of the feed gas is low (RH: 30% or less) and a case where the relative humidity (RH) of the feed gas is high (RH: 100%), and the ratio is obtained by the above-described Expression (1). Note that the electrical double layer capacitance of the membrane electrode assembly can be obtained by the electrochemical impedance spectroscopy (EIS).

Note that a reason for employing the relative humidity of 30% and the relative humidity of 100% with regard to the ratio represented by the above-described Expression (1) is as follows. Under a high-humidity condition, an electrical double layer formed on an interface between the electrically-conductive support and water adsorbed to the surface of the support or between the support and the proton-conductive material is measured. Meanwhile, under a low-humidity condition, the electrical double layer formed on the interface between the electrically-conductive support and the proton-conductive material is mainly measured.

Figure 18:
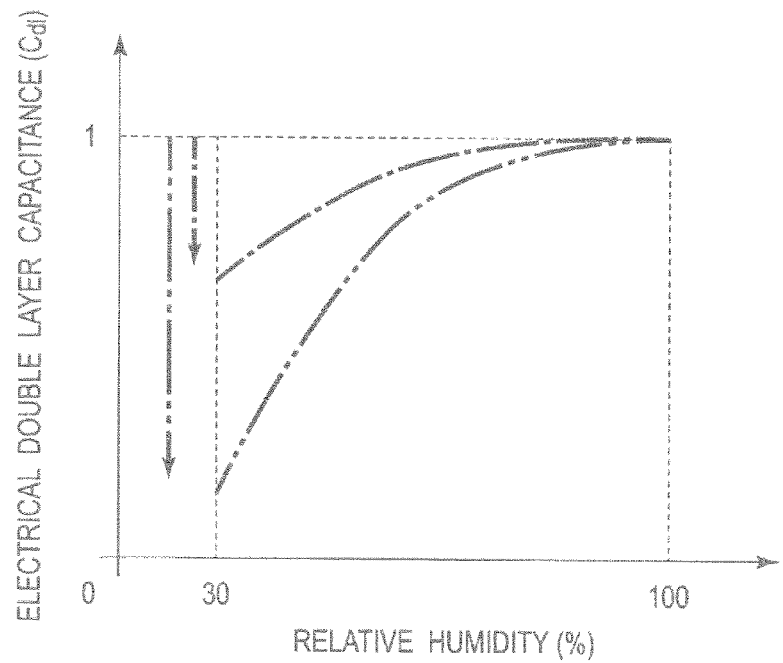
FIG. 18 is a graph showing relationships between electrical double layer capacitance (Cdl) of a fuel cell membrane electrode assembly and relative humidity (RH) of feed gas.

Then, FIG. 18 is a graph showing results of fabricating the artificial membrane electrode assembly by using the support that does not contain the catalyst particles, and measuring the electrical double layer capacitance (Cdl) with respect to the relative humidity (RH) of the feed gas. Here, one shown by an alternate long and short dash line shows a case where the above-described contact ratio is high, and one shown by a chain double-dashed line shows a case where the above-described contact ratio is low. As shown in FIG. 18, at the relative humidity of 30% or less, the electrical double layer capacitance becomes substantially constant. Therefore, in the present invention, the relative humidity of 30% or less and the relative humidity of 100% are determined as representative points of the low-humidity condition and the high-humidity condition, respectively, and a ratio of the electrical double layer capacitances of both thereof is obtained, and is thereby taken as an index as to how much the support is coated with the proton-conductive material.

[Fifteenth Embodiment]

Among the respective embodiments described above, in the embodiments in each of which two types of the proton-conductive materials different in dry mass value (EW) per mole of the proton-donating group such as the sulfonic acid group form a layer structure with two layers or the like. It is preferable to adopt the following configuration. Specifically, in Embodiments 1 to 3, 5 to 10 and 12 to 14, it is preferable to adopt the following configuration.

That is to say, the electrode catalyst layer in each of the embodiments includes: a proton-conductive material (high EW material) in which the dry mass value per mole of the proton-donating group is relatively high; and a proton-conductive material (low EW material) in which the dry mass value per mole of the proton-donating group is relatively low. Then, it is preferable that a ratio of the low EW material to the high EW material in the mass ratio differ in a plane of the electrode catalyst layer. Moreover, it is preferable that, in a region where the relative humidity of the gas in the gas flow passages is 90% or more, a catalyzer in which a ratio (high EW material/low EW material (mass ratio)) of the high EW material with respect to the low EW material in the mass ratio is large be arranged.

Here, the region where the relative humidity is 90% RH or more differs for each of the fuel cells depending on a flow rate of the gas, a flow rate of water as the coolant, a fuel cell inlet temperature of water, and the like. As typical examples of such a region, there can be mentioned, a gas introduction port on the anode side and a vicinity thereof; a gas discharge post on the anode side and a vicinity thereof and a gas discharge port on the cathode side and a vicinity thereof.

Note that a description is made of meanings of these while taking as an example "gas discharge port on the cathode side and the vicinity thereof", "Gas discharge port on the cathode side" stands for a region within ⅒ from the discharge port when a region from the cathode gas introduction port to the discharge port is divided equally into ten regions from an upstream side to a downstream side by being appropriately converted and modeled. Moreover, "Vicinity of the gas discharge port on the cathode side" stands for a region within ⅓ from the discharge port when the region from the cathode gas introduction port to the discharge port is divided equally into equal three regions from the upstream side to the downstream side by being appropriately converted and modeled.

Proton conductivity of the high EW material is lowered than that of the low EW material; however, in a high-humidity atmosphere, such lowering of the proton conductivity can be lowered. Hence, the catalyzer in which the ratio of the high EW material with respect to the low EW material is large is arranged in the region of the flow passages, where the relative humidity of the gas is 90% RH or more, whereby the lowering of the proton conductivity can be suppressed.

Moreover, the proton-donating group such as the sulfonic acid group and the like are suppressed from being adsorbed to the catalyst, whereby the catalytic activity can be enhanced, and the power generation performance can be enhanced.

Figure 19:
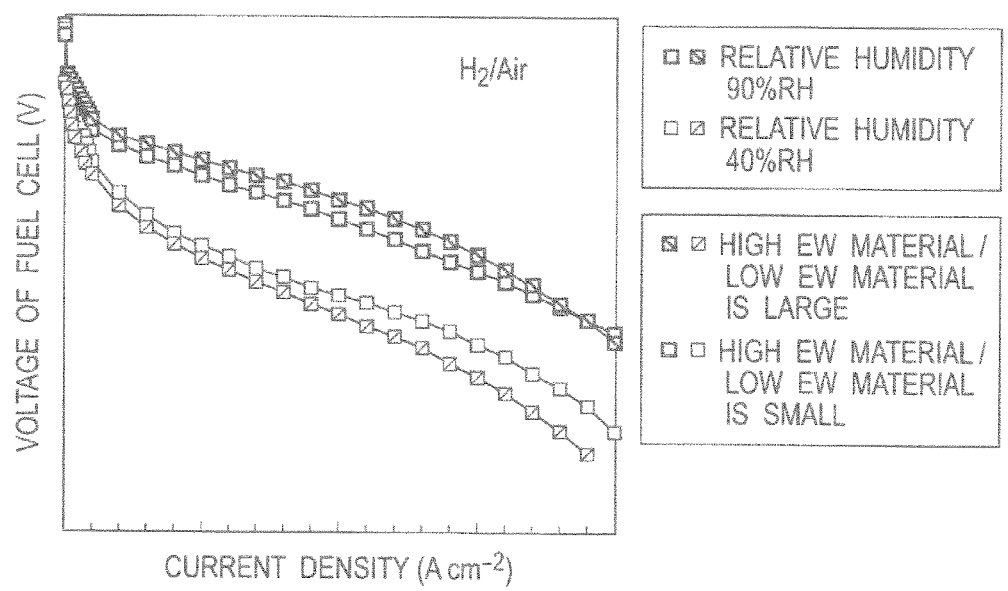
FIG. 19 is a graph showing tendencies of power generation performance of the membrane electrode assembly.

That is to say, with regard to the proton-conductive materials stacked as two layers and the like, if the ratio of the high EW material is large, then there is a possibility that a performance enhancement effect may be reduced in the region where the relative humidity is low as shown in FIG. 19. Therefore, it is preferable that, for example, the catalyzer in which the ratio of the high EW material with respect to the low EW material is large be arranged in the region where the relative humidity is 90% RH or more. Here, as suitable examples of the region where the relative humidity is 90% RH or more, the gas discharge port and the vicinity thereof can be mentioned. Moreover, it is preferable that the catalyzer in which the ratio of the high EW material with respect to the low EW material is small be arranged in the region where the relative humidity is less than 90% RH.

Moreover, in a case of considering humidity dependence of the power generation performance, it is preferable that the ratio of the high EW material with respect to the low EW material be ⅔ or more.

Meanwhile, as a suitable form, one can be mentioned, in which the catalyzer in which the ratio of the high EW material with respect to the low EW material is large is arranged in a region where a temperature is higher than an average value of an inlet temperature and outlet temperature of water as the coolant. If the form as mentioned above is employed, then there is a possibility that the performance enhancement effect may be increased since it is considered that the above-described region with high temperature is a region where the electrode reaction progresses with ease and the relative humidity is high.

[Sixteenth Embodiment]

Among the respective embodiments described above, in the embodiments in each of which two types of the proton-conductive materials different in dry mass value (EW) per mole of the proton-donating group such as the sulfonic acid group form a layer structure with two layers or the like, it is preferable to adopt the following configuration. Specifically, in Embodiments 1 to 3, 5 to 10 and 12 to 14, it is preferable to adopt the following configuration.

That is to say, in each of the embodiments described above, it is preferable that the supported amount of the catalyst in the electrode catalyst layer be 0.35 mg/cm$^2$ or less, and it is more preferable that the supported amount of the catalyst be 0.12 mg/cm$^2$ or less. With regard, to the proton-conductive materials stacked as two layers and the like, if the supported amount of the catalyst is large, then there is a possibility that the performance enhancement effect may be reduced, and accordingly, it is preferable that the supported amount of the catalyst be reduced in the above-described range.

[Seventeenth Embodiment]

Among the respective embodiments described above, in the embodiments in each of which two types of the proton-conductive materials different in dry mass value (EW) per mole of the proton-donating group such as the sulfonic acid group form a layer structure with two layers or the like, it is preferable to adopt the following configuration. Specifically, in Embodiments 1 to 3, 5 to 10 and 12 to 14, it is preferable to adopt the following configuration.

That is to say, in each of the embodiments described above, it is preferable to use a carbon support, in which a specific surface area is large, and a contact ratio of the proton-conductive materials is small. Specifically, in a case where the specific surface area of the carbon support is 1.50 m$^2$/g or more, then it is preferable that the contact ratio of the proton-conductive materials with the carbon support be 0.4 or less. Moreover, in a case where the specific surface area of the carbon support is 700 m$^2$/g or more, then it is preferable that the contact ratio of the proton-conductive materials with the carbon support be 0.35 or less. In a case where there is applied a support, in which a supported amount of platinum is as low as 0.12 mg/cm$^2$, and a contact ratio of the proton-conductive materials is large, then there is a possibility that the performance enhancement effect may be reduced in the region where the relative humidity is low. Accordingly, the carbon support, in which the specific surface area is as high as the above-described predetermined range, and the contact ratio of the proton-conductive materials is small, is applied, whereby the lowering of the performance enhancement effect can be suppressed.

A manufacturing method of the fuel cell is not particularly limited, and the knowledge heretofore known in public in the field of the fuel cell can be referred to as appropriate. Moreover, the electrode catalyst layer, the electrode, the membrane electrode assembly, and the fuel cell, which are mentioned above, can be fabricated, for example by such methods as will be described below.

First, the catalyst particles are dispersed in and supported on the support, whereby the electrode catalyst is prepared. At this time, a method heretofore known in public, such as a precipitation method, a gelation method, an impregnation method and an ion exchange method can be applied.

Subsequently, the catalyzer is prepared by using the electrode catalyst, two or more of the proton-conductive materials, and a solvent that dissolves the proton-conductive material. This preparation process of the catalyzer can form the configuration of each of the above-described embodiments by changing a way and order of mixing the electrode catalyst and the respective proton-conductive materials with each other, and changing the varieties of concentrations and ratios.

Thereafter, the obtained catalyzer is arranged on the polymer electrolyte membrane by spray coating, printing and the like, whereby the electrode catalyst layer is directly formed. In such a way, file electrode catalyst layers, the electrodes and the membrane electrode assembly can be obtained, and further, are sandwiched by the gas diffusion layers, the separators and the like, whereby the fuel cell can be obtained.

Moreover, in another forming method of the electrode catalyst layer or the like, the obtained catalyzer is arranged on the gas diffusion layer by the spray coating, the printing and the like, whereby the electrode catalyst layer is directly formed. In such a way, the electrode catalyst layer and the electrode can be obtained. Furthermore, by such gas diffusion layers on which the electrode catalyst layers are formed, the polymer electrolyte membrane is sandwiched, whereby the membrane electrode assembly and the fuel cell can be obtained.

Furthermore, in still another forming method of the electrode catalyst layer or the like, the obtained catalyzer is arranged on a transfer material (for example, a film and the like) by the spray coating, the printing and the like, whereby the electrode catalyst layer is formed. This is transferred to the polymer electrolyte membrane whereby the membrane electrode assembly can be obtained.

Fuel for use in an event of operating the fuel cell is not particularly limited. For example, there can be used hydrogen, methanol, ethanol 1-propanol, 2-propanol, 1-butanol, secondary butanol, tertiary butanol, dimethyl ether, diethyl ether, ethylene glycol, diethylene glycol, and the like. Among them, hydrogen and methanol are preferably used in a point that it is possible to achieve a high output.

EXAMPLES

The present invention will be described below more in detail by examples and comparative examples; however, the present invention is not limited to these examples.

Example 1-1

<Preparation of Electrode Catalyst Slurry>

First, Ketjen black was baked at 2000° C. for 1 hour under a nitrogen atmosphere in an electric furnace, and graphitized Ketjen black was generated. Note that a nitrogen BET specific surface area of the Ketjen black was 718 $m^2/g$, and a nitrogen BET specific surface area of the graphitized Ketjen black was 151 $m^2/g$.

Subsequently, 5 mass parts of the graphitized Ketjen black as the electrically-conductive support was sufficiently dispersed into 2500 mass parts of a 0.2 mass % platinum-containing chloroplatinic acid solution by using a homogenizer so the a supported concentration of platinum particles in the electrode catalyst could be 50 mass %. Moreover, 50 mass parts of sodium citrate was added, followed by sufficient mixing, whereby a reaction liquid was prepared. Furthermore, by using a reflux reactor, the reaction liquid was subjected to reflux at 85° C. for 4 hours while being stirred, whereby the platinum subjected to reduction was supported on a surface of the graphitized Ketjen black.

After the reaction was ended, such a sample solution was cooled down to room temperature, and powder of the graphitized Ketjen black on which the platinum was supported was filtrated by a suction filtration device, and was sufficiently washed by water. Thereafter, the water-washed powder was dried at 80° C. tor 6 hours under reduced pressure, and an electrode catalyst composed of platinum-supported graphitized Ketjen black was obtained.

Next, 5 g of the electrode catalyst composed of the platinum-supported graphitized Ketjen black, 70 g of ion-exchanged water, 45 g of ethyl alcohol and 6.3 g of the proton-conductive material were mixed with one another. Here, as the proton-conductive material, perfluorosulfonic acid ionomer IN-PE2 (25 mass %, EW: 1580) made by Asahi Glass Co., Ltd. was used. Moreover, a mixture obtained as above was sufficiently dispersed by a bead mill. (Sand Grinder made by Ashizawa Finetech, Ltd.), and in addition, was condensed under reduced pressure, whereby electrode catalyst slurry A was obtained. A solid concentration of the electrode catalyst slurry A after the condensation was 30 mass %.

Then, 6 g of the electrode catalyst slurry A was added with 40 g of ion-exchanged water, and was sufficiently mixed and dispersed by a medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer, whereby uniform catalyst slurry was obtained in this event, as the proton-conductive material, perfluorosulfonic acid ionomer IN201 (21 mass %, EW: 660) made by Asahi Glass Co., Ltd. was used. Moreover, the above-described catalyst slurry was added with 21.5 g of ethyl alcohol, and was sufficiently mixed and dispersed one more time, whereby uniform electrode catalyst slurry B was obtained.

Note that, in the electrode catalyst slurry B, the ratio (mass ratio) of the proton-conductive material with respect to the electrically-conductive support is 0.45. Moreover, this example is an example where two types of the proton-conductive materials different in EW form a two-layer structure.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex (registered trademark) made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry B was coated by the spray coating method to a size of 5 cm×2 cm. Thereafter, a resultant was subjected to heat treatment at 80° C. for 15 minutes, and an electrode catalyst layer was obtained. A supported amount of platinum at this time is 0.12 $mg/cm^2$.

<Fabrication of Anode Catalyst Layer>

In a similar way to the electrode catalyst slurry A, 3.4 g of the electrode catalyst composed of the platinum-supported graphitized Ketjen black, 82 g of ion-exchanged water, 50 g of normal propyl alcohol, and 15 g of NAFION as the proton-conductive material were added with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry A' was obtained.

Then, in a similar way to the cathode catalyst layer, the electrode catalyst slurry A' was spray-coated onto the electrolyte membrane and was subjected to heat treatment, whereby an anode catalyst layer was formed, and a membrane electrode assembly of this example was obtained.

Example 1-2

<Preparation of Electrode Catalyst Slurry>

5 g of the electrode catalyst composed of the platinum-supported graphitized Ketjen black obtained in Example 1-1, 70 g of ion-exchanged water, 45 g of ethyl alcohol and 6.3 g of the proton-conductive material were mixed with one another. Here, as the proton-conductive material, the perfluorosulfonic acid ionomer IN-PE2 (25 Mass %, EW: 1580) made by Asahi Glass Co., Ltd. was used. Moreover, a mixture obtained as above was sufficiently mixed and dispersed, by the bead mill (Sand Grinder made by Ashizawa Finetech, Ltd.), whereby electrode catalyst slurry C was obtained.

Moreover, 6 g of the electrode catalyst slurry C was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (Made by Primix Corporation), whereby uniform catalyst slurry was obtained. In this event, as the proton-conductive material perfluorosulfonic acid ionomer IN201 (21 mass %t EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry C' was obtained. Note that, in the electrode catalyst slurry C', the ratio (mass ratio) of the proton-conductive material with respect to the electrically-conductive support is 0.45. Moreover, this example is an example of forming a structure in which two types of the proton-conductive materials different in EW are mixed with each other.

Then, similar operations to those of Example 1-1 were repeated except that a cathode catalyst layer was fabricated by using the obtained electrode catalyst slurry C', and a membrane electrode assembly of this example was obtained.

Comparative Example 1-1

In a similar way to the electrode catalyst slurry A, 5 g of the electrode catalyst composed of the platinum-supported graphitized Ketjen black, 74 g of ion-exchanged water, 44 g of ethyl alcohol and 13 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently mixed and dispersed by the bead mill (Sand Grinder made by Ashizawa Finetech, Ltd.), whereby electrode catalyst slurry D was obtained. Note that, in the electrode catalyst slurry D, the ratio (mass ratio) of the proton-conductive material with respect to the electrically-conductive support is 0.9.

Similar operations to those of Example 1-1 were repeated except that a cathode catalyst layer was fabricated by using the obtained electrode catalyst slurry D, and a membrane electrode assembly of this example was obtained.

Comparative Example 1-2

<Preparation of Electrode Catalyst Slurry>

In a similar way to the electrode catalyst slurry A, 5.3 g of the electrode catalyst composed of the platinum-supported graphitized Ketjen black, 74 g of ion-exchanged water, 50 g of ethyl alcohol and 16 g of the proton-conductive material were mixed with one another. Here, as the proton-conductive material, the perfluorosulfonic acid ionomer IN201 (20 mass %, EW: 660) made by Asahi Glass Co., Ltd. was used. Moreover, a mixture obtained as above was sufficiently mixed and dispersed by the bead mill (Sand Grinder made by Ashizawa Finetech, Ltd.), whereby electrode catalyst slurry E was obtained. Note that, in the electrode catalyst slurry E, the ratio (mass ratio) of the proton-conductive material with respect to the electrically-conductive support is 0.9.

Similar operations to those of Example 1-4 were repeated except that a cathode catalyst layer was fabricated by using the obtained electrode catalyst slurry E, and a membrane electrode assembly of this example was obtained.

Comparative Example 1-3

<Preparation of Electrode Catalyst Slurry>

In a similar way to the electrode catalyst slurry A, 5.3 g of the electrode catalyst composed of the platinum-supported graphitized Ketjen black, 76 g of ion-exchanged water, 48 g of normal propyl alcohol and 16 g of NAFION as the proton-conductive material were mixed with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry F was obtained. Note that, in the electrode catalyst slurry F, the ratio (mass ratio) of the proton-conductive material with respect to the electrically-conductive support is 0.9.

Then, similar operations to those of Example 1-1 were repeated except that a cathode catalyst layer was fabricated by using the obtained electrode catalyst slurry F, and a membrane electrode assembly of this example was obtained.

[Performance Evaluation]

(Oxygen Redaction Activity Evaluation)

Figure 20:
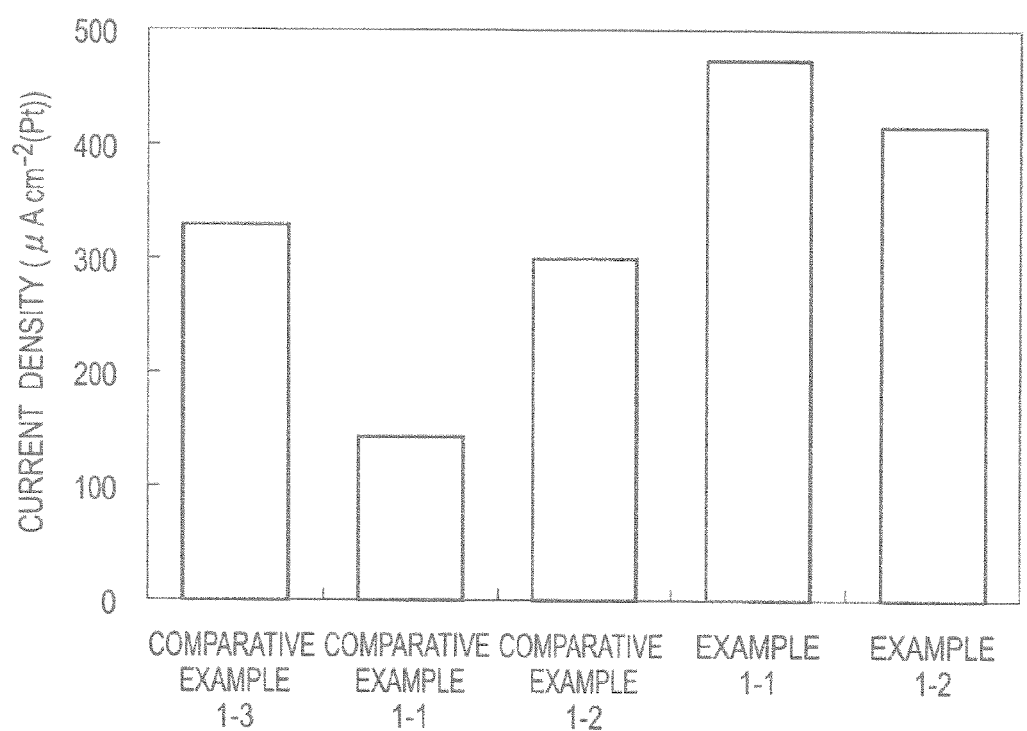
FIG. 20 is a graph showing results of oxygen reduction activity evaluations in membrane electrode assemblies of respective examples.

For the membrane electrode assembly of each of the above-described examples, an oxygen reduction activity evaluation was performed under the following evaluation conditions. Specifically, a generated current per platinum surface area at a time of 0.9V was measured. Obtained results are shown in FIG. 20.

<Evaluation Conditions>
Temperature: 80° C.
Gas component: hydrogen (anode side)/oxygen (cathode side)
Relative humidity: 100% RH/100% RH
Pressure: 150 kPa (abs)/150 kPa (abs)
Voltage scan direction: anode (Power Generation Performance Evaluation)

For the membrane electrode assembly of each of the above-described examples, an evaluation of the power generation performance was performed under the following evaluation conditions. Specifically, a voltage at a time of 1.5 A/cm$^2$ was measured. Obtained, results are shown ion Table 1.

<Evaluation Conditions>
Temperature: 80° C.
Gas component: hydrogen (anode side)/air (cathode side)
Relative humidity: 90% RH/90% RH
Pressure: 200 kPa (abs)/2000 kPa (abs)

TABLE 1

|  | Voltage (V) |
|---|---|
| Example 1-1 | 0.540 |
| Example 1-2 | 0.538 |
| Comparative example 1-1 | 0.319 |
| Comparative example 1-2 | 0.429 |
| Comparative example 1-3 | 0.485 |

From FIG. 20 and Table 1, it is understood that Example 1-1 and Example 1-2 are excellent in generated current per platinum surface area at the time of 0.9V and voltage at the time of 1.5 A/cm$^2$ in comparison with Comparative example 1-1. Comparative example 1-2 and Comparative example 1-3. In other words, each of Example 1-1 and Example 1-2 includes two or more proton-conductive materials, which coat the catalyst and the support, and are different in dry mass value per mole of the proton-donating group such as the sulfonic acid group. Furthermore, each of these examples has a configuration. In which the proton-conductive material in which the dry mass value per mole of the proton-donating group is the highest among the proton-conductive materials is brought into contact with at least a part of the catalyst. It is understood that, in such a way, even in the case where the supported amount of the catalyst is lowered, excellent power generation performance can be realized by enhancing the apparent catalytic activity and the proton transport properties, and so on.

Moreover, the reason why Example 1-1 is excellent in generated current and voltage in comparison with Example 1-2 is also considered to be because the contact ratio of the proton-conductive material with the surface of the catalyst is the largest, the proton-conductive material having the highest dry mass value per mole of the proton-donating group among the proton-conductive materials.

Furthermore, the reason why Example 1-2 is excellent is also considered to be because the dry mass value per mole of the sulfonic acid group is 1200 or more, the dry mass value belonging to the proton-conductive material in which the dry mass value is the highest among the proton-conductive materials.

Furthermore, the reason why Example 1-2 is excellent is also considered to be because the ratio of the proton-conductive material with respect to the support is 0.5 or less in the mass ratio, the proton-conductive material having 1200 or more as the dry mass value per mole of the sulfonic acid group.

Furthermore, the reason why Example 1-2 is excellent is also considered to be because the proton-conductive materials are composed of: the proton-conductive material in which the dry mass value per mole of the sulfonic acid group is 1200 or more; and the proton-conductive material in which, the dry mass value per mole of the sulfonic acid group is 700 or less.

Furthermore, the reason why Example 1-2 can obtain excellent results is also considered to be because the contact ratio (θ) represented by the above-described Expression (1) is 0.4 or more.

Example 2-1

<Preparation of Electrode Catalyst Slurry>

First, the graphitized Ketjen black as the electrically-conductive support was immersed into a platinum-containing aqueous solution so that a supported concentration of platinum in the electrode catalyst could be 30 mass %, followed by drying, whereby platinum was supported thereon. Furthermore, a resultant was subjected to heat treatment at 1000° C. for 1 hour in a nitrogen atmosphere, and an electrode catalyst composed of the platinum-supported graphitized Ketjen black was obtained.

Next, 5 g of the electrode catalyst composed of the platinum-supported graphitized Ketjen black, 70 g of ion-exchanged water, 45 g of ethyl alcohol and 6.3 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently dispersed by the bead mill (Sand Grinder made by Ashizawa Finetech, Ltd.), and in addition, was condensed under reduced pressure, whereby electrode catalyst slurry G1 was obtained. A solid concentration of the electrode catalyst slurry G1 after the condensation was 30 mass %.

Then, 6 g of the electrode catalyst slurry (G1) was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 600) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry H1 was obtained.

Note that, in the electrode catalyst slurry H1, the ratio (mass ratio) of the proton-conductive material with respect to the electrically-conductive support is 0.45. Moreover, this example is an example where two types of the proton-conductive materials different in EW form the two-layer structure.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry H1 was coated by the spray coating method to a size of 5 cm×6 cm. Thereafter, a resultant was subjected to heat treatment at 80° C. for 15 minutes, and an electrode catalyst layer was obtained. The supported amount of platinum at this time is 0.12 mg/cm².

<Fabrication of Anode Catalyst Layer>

The electrode catalyst slurry A' obtained in Example 1-1 was spray-coated onto the electrolyte membrane and was subjected to heat treatment whereby an anode catalyst layer (5 cm×6 cm) was formed, and a membrane electrode assembly of this example was obtained.

Example 2-2

<Preparation of Electrode Catalyst Slurry>

First, 5 g of the electrode catalyst composed of the platinum-supported graphitized Ketjen black obtained in Example 2-1, 70 g of ion-exchanged water, 45 g of ethyl alcohol and 2.8 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently mixed by the bead mill (Sand Grinder made by Ashizawa Finetech, Ltd.), and in addition, was condensed under reduced pressure, whereby electrode catalyst slurry G2 was obtained. A solid concentration of the electrode catalyst slurry G2 after the condensation was 30 mass %.

Then, 6 g of the electrode catalyst slurry G2 was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW; 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry H2 was obtained.

Note that, in the electrode catalyst slurry H2, the ratio (mass ratio) of the proton-conductive materiel with respect to the electrically-conductive support is represented as: high EW material/low EW material=0.20/0.45. Moreover, this example is an example where two types of the proton-conductive materials different in EW form the two-layer structure.

<Fabrication of Cathode Catalyst Layer>

Next, gaskets were arranged on peripheries of both surfaces of a polymer electrolyte membrane. As the polymer electrolyte-membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst, slurry H2 was coated by the spray coating method to a size of 5 cm×4 cm. Thereafter, a resultant was subjected to heat treatment at 80° C. for 15 minutes, and an electrode catalyst layer was obtained. The supported amount of platinum at this time is 0.12 mg/cm$^2$.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×6 cm) was formed, and a membrane electrode assembly of this example was obtained.

Example 2-3

<Preparation of Electrode Catalyst Slurry>

First, 5 g of the electrode catalyst composed of the platinum-supported graphitized Ketjen black obtained in Example 24, 20 g of ion-exchanged water, 45 g of ethyl alcohol and 4.2 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently mixed by the bead mill (Sand Grinder made by Ashizawa Finetech, Ltd.), and in addition, was additionally condensed under reduced pressure, whereby electrode catalyst slurry G3 was obtained. A solid concentration of the electrode catalyst slurry G3 after the condensation was 30 mass %.

Then, 6 g of the electrode catalyst slurry (G3) was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry H3 was obtained.

Note that to the electrode catalyst slurry H3, the ratio (mass ratio) of the proton-conductive material with respect to the electrically-conductive support is represented as: high EW material/low EW material=0.30/0.45. Moreover, this example is an example where two types of the proton-conductive materials different in EW form the two-layer structure.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry H3 was coated by the spray coating method to a size of 5 cm×4 cm. Thereafter, a resultant was subjected to heat treatment at 80° C. for 15 minutes, and an electrode catalyst layer was obtained. The supported amount of platinum at this time is 0.12 mg/cm$^2$.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×6 cm) was formed, and a membrane electrode assembly of this example was obtained.

Comparative Example 2-1

<Preparation of Electrode Catalyst Slurry>

First, 5.3 g of the electrode catalyst composed of the platinum-supported graphitized Ketjen black obtained in Example 2-1, 76 g of ion-exchanged water, 48 g of normal propyl alcohol and 16 g of NAFION as the proton-conductive material were mixed with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry I was obtained. Note that the ratio (mass ratio) of the proton-conductive material with respect to the electrically-conductive support is 0.9.

<Fabrication of Cathode Catalyst Layer>

Next gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry I was coated by the spray coating method to a size of 5 cm×6 cm. Thereafter, a resultant was subjected to heat treatment at 80° C. for 15 minutes, and an electrode catalyst layer was obtained. The supported amount of platinum at this time is 0.12 mg/cm$^2$.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×6 cm) was formed, and a membrane electrode assembly of this example was obtained.

[Performance Evaluation]

(Humidity Dependence Evaluation of Power Generation Performance)

For the membrane electrode assembly of each of Example 2-1 to Example 2-3 and Comparative example 2-1, a humidity dependence evaluation of the power generation performance was performed under the following evaluation conditions. Specifically, voltages at a time when a current density was 0.1. A/cm$^2$ and at a time when the current density was 1.0/cm$^2$ were measured while changing the relative humidity. Obtained results are shown in FIG. 21 and FIG. 22.

<Evaluation Conditions>
Temperature: 80° C.
Gas component; hydrogen (anode side)/air (cathode side)
Relative humidity: 40 to 100% RH (both electrodes)
Pressure: 200 kPa (abs)/2000 kPa (abs)

Figure 21:
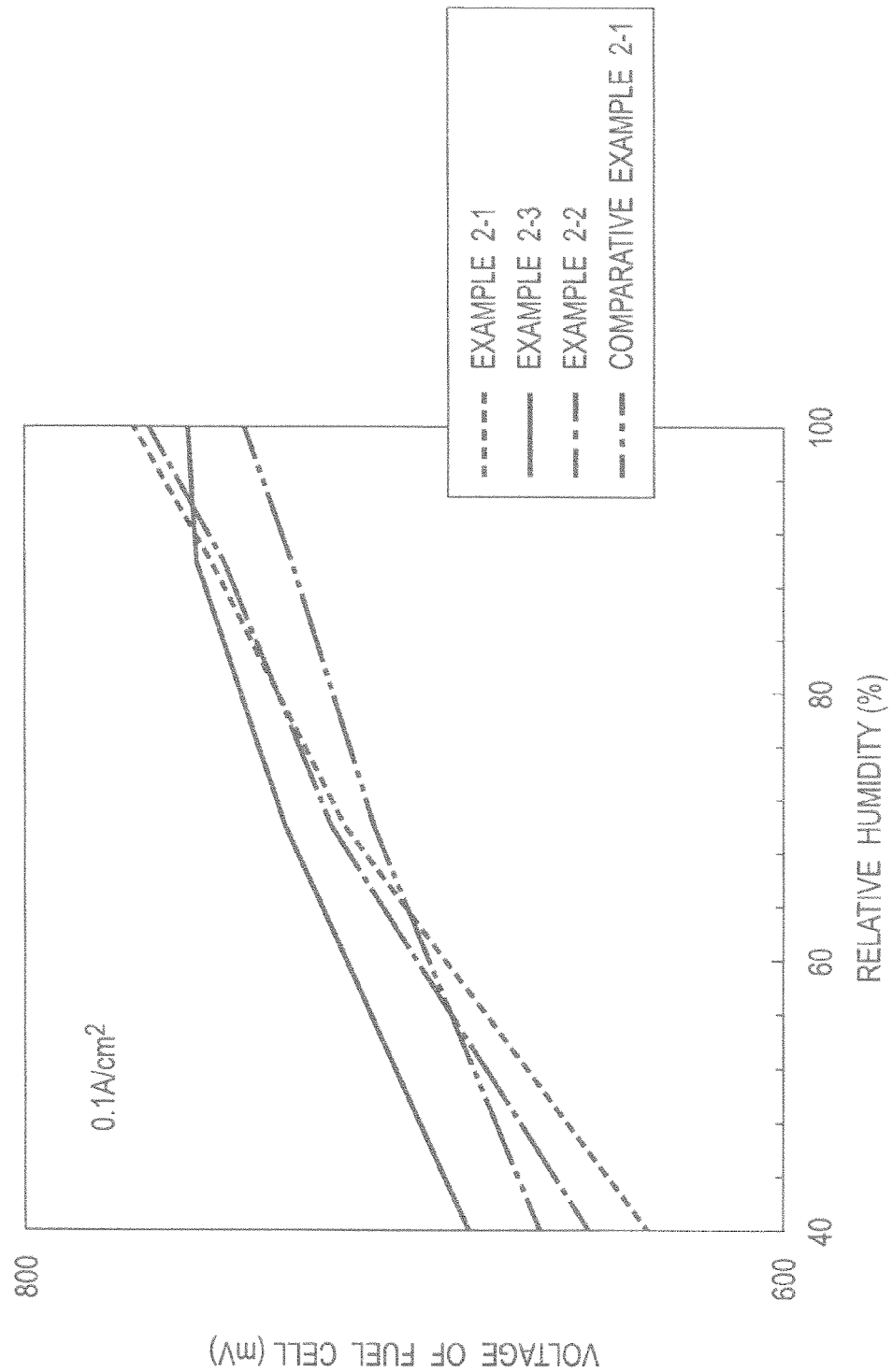
FIG. 21 is a graph showing results of humidity dependence evaluations of power generation, performance in membrane electrode assemblies of respective examples.

From FIG. 21 and FIG. 22, it is understood that the electrode catalyst layer in which the ratio of the high EW/low EW is large be preferably arranged in the region where the relative humidity is 90% RH or more. Moreover, it is understood that the electrode catalyst layer in which the ratio of the high EW/low EW is small be preferably arranged in the region where the relative humidify is 90% RH or less.

Example 3-1

<Preparation of Electrode Catalyst Slurry>
First, 5 mass parts of the Ketjen black as the electrically-conductive support was sufficiently dispersed into 2500 mass parts of the 0.2 mass % platinum-containing chloroplatinic acid solution by using the homogenizer so that the supported concentration of the platinum particles in the electrode catalyst could be 50 mass %. Note that the nitrogen BET specific surface area of the Ketjen black was 718 m$^2$/g. Moreover, 50 mass parts of the sodium citrate was added, followed by sufficient mixing, whereby a reaction liquid was prepared. Furthermore, by using the reflux reactor, the reaction liquid was subjected to reflux at 85° C. for 4 hours while being stirred, whereby the platinum subjected to reduction was supported on the surface of the Ketjen black.

After the reaction, was ended, such a sample solution was cooled down to room temperature, and powder of the Ketjen black on which the platinum was supported was filtrated by the suction filtration device, and was sufficiently washed by water. Thereafter, the water-washed powder was dried at 80° C. for 6 hours under reduced pressure, and an electrode catalyst composed of platinum-supported Ketjen black was obtained.

Next, 5 g of the electrode catalyst composed of the platinum-supported Ketjen black, 70 g of ion-exchanged water, 45 g of ethyl alcohol and 6.3 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently dispersed by the bead mill (Sand Grinder made by Ashizawa Finetech, Ltd.), and in addition, was condensed under reduced pressure, whereby electrode catalyst slurry J1 was obtained. A solid concentration of the electrode catalyst slurry J1 after the condensation was 30 mass %.

Then, 6 g of the electrode catalyst slurry J1 was added with 40 g of ion-exchanged water, and was sufficiently mixed and dispersed by the medialess high-speed, shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst-slurry K1 was obtained.

Note that, in the electrode catalyst slurry K1, the ratio (mass ratio) of the proton-conductive material with respect to the electrically-conductive support is 0.45. Moreover, this example is an example where two types of the proton-conductive materials different in EW form a two-layer structure.

<Fabrication of Cathode Catalyst Layer>
Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry K1 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.35 mg/cm$^2$.

<Fabrication of Anode Catalyst Layer>
The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Example 3-2

<Preparation of Electrode Catalyst Slurry>
First, 5 mass parts of the Ketjen black as the electrically-conductive support was sufficiently dispersed into 2500 mass parts of the 0.2 mass % platinum-containing chloroplatinic acid solution by using the homogenizer so that the supported concentration of the platinum particles in the electrode catalyst could be 50 mass %. Note that the nitrogen BET specific surface area of the Ketjen black was 718 m$^2$/g. Moreover, 50 mass parts of the sodium citrate was added, followed by sufficient mixing, whereby a reaction liquid was prepared. Furthermore, by using the reflux reactor, the reaction liquid was subjected to reflux at 85° C. for 4 hours while being stirred, whereby the platinum subjected to reduction was supported on the surface of the Ketjen black.

After the reaction was ended, such a sample solution was cooled down to room temperature, and powder of the Ketjen black on which the platinum was supported was filtrated by the suction filtration device, and was sufficiently washed by water. Thereafter, the water-washed powder was dried at 80° C. for 6 hours under reduced pressure, and an electrode catalyst composed of platinum-supported Ketjen black was obtained.

Next, 5 g of the electrode catalyst composed of the platinum-supported Ketjen black, 70 g of ion-exchanged water, 45 g of ethyl alcohol and 6.3 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently dispersed by the bead mill (Sand Grinder made by Ashizawa Finetech, Ltd.), and in addition, was condensed under reduced pressure, whereby electrode catalyst slurry J2 was obtained. A solid concentration of the electrode catalyst slurry J2 after the condensation was 30 mass %.

Then, 6 g of the electrode catalyst slurry J2 was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry K2 was obtained.

Note that, in the electrode catalyst slurry K2, the ratio (mass ratio) of the proton-conductive material with respect to the electrically-conductive support is 0.45. Moreover, this example is an example where two types of the proton-conductive materials different in EW form a two-layer structure.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry K2 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm$^2$.

<Fabrication of Anode Catalyst Layer>

The electrode catalyst, slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Comparative Example 3-1

<Preparation of Electrode Catalyst Slurry>

First, 5 mass parts of the Ketjen black as the electrically-conductive active support was sufficiently dispersed into 2500 mass parts of the 0.2 mass % platinum-containing chloroplatinic acid solution by using the homogenizer so that the supported concentration of the platinum particles in the electrode catalyst could be 50 mass %. Note that the nitrogen BET specific surface area of the Ketjen black was 718 m$^2$/g. Moreover, 50 mass parts of the sodium citrate was added, followed by sufficient mixing, whereby a reaction liquid was prepared. Furthermore, by using the reflux reactor, the reaction liquid was subjected to reflux at 85° C. for 4 hours while being stirred, whereby the platinum subjected to reduction was supported on the surface of the Ketjen black.

After the reaction was ended, such a sample solution was cooled down to room temperature, and powder of the Ketjen black on which the platinum was supported was filtrated by the suction filtration device, and was sufficiently washed by water. Thereafter, the water-washed powder was dried at 80° C. for 6 hours under reduced pressure, and an electrode catalyst composed of platinum-supported Ketjen black was obtained.

Next, 5.3 g of the electrode catalyst composed of the platinum-supported Ketjen black, 76 g of ion-exchanged water, 48 g of normal propyl alcohol and 16 g of NAFION as the proton-conductive material were mixed with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry L1 was obtained.

Note that, in the electrode catalyst slurry L1, the ratio (mass ratio) of the proton-conductive material with respect to the electrically-conductive support is 0.9.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry L1 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.35 mg/cm$^2$.

<Fabrication of Anode Catalyst Layer>

The electrode catalyst, slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Comparative Example 3-2

<Preparation of Electrode Catalyst Slurry>

First, 5 mass parts of the Ketjen black as the electrically-conductive support was sufficiently dispersed into 2500 mass parts of the 0.2 mass % platinum-containing chloroplatinic acid solution by using the homogenizer so that the supported concentration of the platinum particles in the electrode catalyst could be 50 mass %. Note that the nitrogen BET specific surface area of the Ketjen black was 718 m$^2$/g. Moreover, 50 mass parts of the sodium citrate was added, followed by sufficient mixing, whereby a reaction liquid was prepared. Furthermore, by using the reflux reactor, the reaction liquid was subjected to reflux at 85° C. for 4 hours while being stirred, whereby the platinum subjected to reduction was supported on the surface of the Ketjen black.

After the reaction was ended, such a sample solution was cooled down to room temperature, and powder of the Ketjen black on which the platinum was supported was filtrated by the suction filtration device, and was sufficiently washed by water. Thereafter, the water-washed powder was dried at 80° C. for 6 hours under reduced pressure, and an electrode catalyst composed of platinum-supported Ketjen black was obtained.

Next, 5.3 g of the electrode catalyst composed of the platinum-supported Ketjen black 76 g ion-exchanged water, 48 g of normal propyl alcohol and 16 g of NAFION as the proton-conducive material were mixed with one another.

Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry L2 was obtained.

Note that, in the electrode catalyst slurry L2, the ratio (mass ratio) of the proton-conductive material with respect to the electrically-conductive support is 0.9.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 µm. Moreover, as each of the gaskets, Teonex made by Teijin DuPont Films Japan Limited was used, a thickness thereof was 25 µm, and an adhesion layer thereof was 10 µm.

Subsequently, onto an exposed portion of one surface of the polymer electrolyte membrane, the electrode catalyst slurry L2 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm$^2$.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

[Performance Evaluation]

(Humidity Dependence Evaluation of Power Generation Performance)

For the membrane electrode assembly of each of Example 3-1, Example 3-2, Comparative example 3-1 and Comparative example 3-2, the humidity dependence evaluation of the power generation performance was performed under the following evaluation conditions. Specifically, a voltage at the time when the current density was 0.1 A/cm$^2$ was measured while changing the relative humidity. Obtained results are shown in FIG. 23.

<Evaluation Condition>

Temperature: 80° C.
Gas component: hydrogen (anode side)/air (cathode side)
Relative humidity; 40 to 100% RH (both, electrodes)
Pressure: 200 kPa (abs)/200 kPa (abs)

Referring to FIG. 23, in a case where the composition of the electrode catalyst layer is the same, an amount of generated water with respect to the thickness of the electrode catalyst layer is increased as the supported amount of platinum is smaller. Therefore, with regard to the present invention that exhibits effects particularly in the high-humidity range, the effects become obvious. Hence, the effects are increased as the supported amount of platinum is being lowered.

Example 4-1

<Preparation of Electrode Catalyst Slurry>

First the Ketjen black as the electrically-conductive support was immersed into a platinum-containing aqueous solution so that the supported concentration of the platinum in the electrode catalyst could be 50 mass % followed by drying, whereby platinum was supported thereon. Furthermore, a resultant was subjected to heat treatment at 1000° C. for 1 hour in the nitrogen atmosphere, and an electrode catalyst composed of the platinum-supported Ketjen black was obtained. Note that the nitrogen BET specific surface area of the Ketjen black was 780 m$^2$/g.

Next, 5 g of the electrode catalyst composed of the platinum-supported Ketjen black, 70 g of ion-exchanged water, 45 g of ethyl alcohol and 63 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently dispersed by the bead mill (Sand Grinder made by Ashizawa Finetech, Ltd.), and in addition, was condensed under reduced pressure, whereby electrode catalyst slurry M1 was obtained. A solid concentration of the electrode catalyst slurry M1 after the condensation was 30 mass %.

Then, 6 g of the electrode catalyst slurry M1 was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry N1 was obtained.

Note that, in the electrode catalyst slurry N1, the ratio (mass ratio) of the proton-conductive material with respect to the electrically-conductive support is 0.45. Moreover, this example is an example where two types of the proton-conductive materials different in EW form a two-layer structure.

<Fabrication of Cathode Catalyst Layers>

Next, gaskets were arranged on peripheries of both surfaces of a polymer electrolyte membrane. As the polymer electrolyte membrane, NAFION NR211 made by DuPont Corporation was used, and a thickness thereof was 25 µm. Moreover, as each of the gaskets, Teonex made by Teijin DuPont Films Japan Limited was used, a thickness thereof was 25 µm, and an adhesion layer thereof was 10 µm.

Subsequently, onto an exposed portion of one surface of the polymer electrolyte membrane, the electrode catalyst slurry N1 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm$^2$. Moreover, the contact ratio at this time is 0.35.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Example 4-2

<Preparation of Electrode Catalyst Slurry>

First the graphitized Ketjen black as the electrically-conductive support was immersed into a platinum-containing aqueous solution so that the supported concentration of the platinum in the electrode catalyst could be 30 mass %, followed by drying, whereby platinum was supported thereon. Furthermore, a resultant was subjected to heat treatment at 1000° C. for 1 hour in the nitrogen atmosphere, and an electrode catalyst composed of the platinum-supported graphitized Ketjen black was obtained. Note that the nitrogen BET specific surface area of the graphitized Ketjen black was 150 m$^2$/g.

Next, 5 g of the electrode catalyst composed of the platinum-supported graphitized Ketjen black, 70 g of ion-exchanged water, 45 g of ethyl alcohol and 6.3 g of the proton-conductive material were mixed with one another. Here, as the proton-conductive material, the perfluorosulfonic acid ionomer IN-PE2 (25 mass %, EW: 1580) made by Asahi Glass Co., Ltd. was used. Moreover, a mixture obtained as above was sufficiently dispersed by the bead mill (Sand Grinder made by Ashizawa Finetech, Ltd.), and in addition, was condensed under reduced pressure, whereby electrode catalyst slurry M2 was obtained. A solid concentration of the electrode catalyst slurry M2 after the condensation was 30 mass %.

Thereafter, 6 g of the electrode catalyst slurry M2 was added with 40 g of ion-exchanged water, and was sufficiently mixed and dispersed by the medialess high-speed shearing stirrer (Made by Primix Corporation), whereby uniform catalyst slurry was obtained. Thereafter, 2.2 g of the proton-conductive material was added, and was sufficiently mixed and dispersed by the above-described medialess high-speed shearing stirrer (made by Primix Corporation), whereby uniform catalyst slurry was obtained. In this event, as the proton-conductive material, the perfluorosulfonic acid ionomer IN201 (21 mass %, EW: 660) made by Asahi Glass Co., Ltd. was used. Moreover, the above-described catalyst slurry was added with 27.5 g of ethyl alcohol, and was sufficiently mixed and dispersed one more time, whereby uniform electrode catalyst slurry N2 was obtained.

Note that, in the electrode catalyst slurry N2, the ratio (mass ratio) of the proton-conductive material with respect to the electrically-conductive support is 0.45. Moreover, this example is an example where two types of the proton-conductive materials different in EW form a two-layer structure.

<Fabrication of Cathode Catalyst Layer>

Next gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry N2 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm$^2$. Moreover, the contact ratio at this time is 1.0.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Comparative Example 4-1

<Preparation of Electrode Catalyst Slurry>

5.3 g of the electrode catalyst composed of the platinum-supported Ketjen black obtained in Example 4-1, 76 g of ion-exchanged water, 48 g of normal propyl alcohol and 16 g of NAFION as the proton-conductive material were mixed with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech Ltd.), whereby electrode catalyst slurry O1 was obtained.

Note that, in the electrode slurry O1, the ratio (mass ratio) of the proton-conductive material with respect to the electrically-conductive support is 0.9.

<Fabrication of Cathode Catalyst Layer>

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry O1 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm$^2$. Moreover, the contact ratio at this time is 0.35.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

Comparative Example 4-2

<Preparation of Electrode Catalyst Slurry>

5.3 g of the electrode catalyst composed of the platinum-supported graphitized Ketjen black obtained in Example 4-2, 76 g of ion-exchanged water, 48 g of normal propyl alcohol and 16 g of NAFION as the proton-conductive material were mixed with one another. Here, as the NAFION, a NAFION solution (made by DuPont Corporation, 20 mass %, EW: 1000) was used. Moreover, a mixture obtained as above was sufficiently mixed and dispersed by the bead mill (Sand Grinder made by Ashizawa Finetech, Ltd.), whereby electrode catalyst slurry O2 was obtained.

Note that, in the electrode slurry O2, the ratio (mass ratio) of the proton-conductive material with respect to the electrically-conductive support is 0.9.

Next, gaskets were arranged on peripheries of both surfaces of a polymer electrolyte membrane. As the polymer electrolyte membrane, NAFION NR211 made by DuPont Corporation was used, and a thickness thereof was 25 μm. Moreover, as each of the gaskets, Teonex made by Teijin DuPont Films Japan Limited was used, a thickness thereof was 25 μm, and an adhesion layer thereof was 10 μm.

Subsequently, onto an exposed portion of one surface of the polymer electrolyte membrane, the electrode catalyst slurry O2 was coated by the spray coating method to a size of 5 cm×2 cm. Thereafter, a resultant was subjected to heat treatment at 80° C. for 15 minutes, and an electrode catalyst layer was obtained. The supported amount of platinum at this time is 0.12 mg/cm². Moreover, the contact ratio at this time is 1.0.

<Fabrication of Anode Catalyst Layer>

The electrode catalyst slurry A' obtained in Example 1-1 was spray-coated onto the electrolyte membrane and was subjected to heat treatment, whereby an anode catalyst layer (5 cm×2 cm) was formed, and a membrane electrode assembly of this example was obtained.

[Performance Evaluation]

(Humidity Dependence Evaluation of Power Generation Performance)

For the membrane electrode assembly of each of Example 4-1, Example 4-2, Comparative example 4-1 and Comparative example 4-3, the humidity dependence evaluation of the power generation performance was performed under the following evaluation conditions. Specifically, a voltage at the time when the current density was 0.1 A/cm² was measured while changing the relative humidity. Obtained results are shown in FIG. 24.

<Evaluation Conditions>

Temperature: 80° C.
Gas component: hydrogen (anode side)/air (cathode side)
Relative humidity: 40 to 100% RH (both electrodes)
Pressure: 200 kPa (ahs)/200 kPa (abs)

Referring to FIG. 24, in the case where the composition of the electrode catalyst layer is the same, the amount of generated water with respect to the thickness of the electrode catalyst layer is increased as the supported amount of platinum is smaller Therefore, with regard to the present invention that exhibits effects particularly in the high-humidity range, the effects are increased. Hence, the effects are increased as the supported amount of platinum is being lowered. In particular, in a case of using the support with a small contact ratio, the ratio of the catalyst coated with the electrolyte is small, and accordingly, effects thereof are developed under a condition where the supported amount is low.

The description has been made above of the present invention by some embodiments and examples; however, the present invention is not limited to these, and is modifiable in various ways within the scope without departing from the spirit of the present invention.

For example, in the present invention, it is preferable that the catalyzer 135 that composes the electrode catalyst layer be configured to include the electrode catalyst 131 and the proton-conductive material 133 that coats the same. However, the proton-conductive material 133 just needs to be in contact with the catalyst 131b, and it is not necessary for the proton-conductive material 133 to coat the catalyst 131b. Therefore, if the proton-conductive material 133 is only in contact with the catalyst 131b, the arrangement and coating aspect thereof are not particularly limited.

Moreover, in each of the embodiments mentioned above, as an example of each of the separators, one is illustrated, in which the gas flow passages are linear and parallel to one another; however, the present invention is not limited to this. For example, even to a case of serpentine-type gas flow passages, the present invention is applicable.

Furthermore, in each of the embodiments mentioned above, as an example of the fuel cell the PEFC that uses hydrogen as fuel is illustrated; however the present invention is not limited to this. For example, even to a case of a direct methanol fuel cell (DMFC) that uses methanol as fuel, the present invention is applicable.

The entire contents of Japanese Patent Application No. 2011-247610 (filed on Nov. 11, 2011) and Japanese Patent Application No. 2012-127269 (filed on Jun. 4, 2012) are incorporated herein by reference.

INDUSTRIAL APPLICABILITY

The fuel cell electrode catalyst layer of the present invention contains: the catalyst; the support, that supports the catalyst; and two or more proton-conductive materials in contact with at least a part of the catalyst and at least a part of the support. The proton-conductive material in which the dry mass value per mole of the proton-donating group is the highest among the proton-conductive materials is in contact with at least a part of the catalyst. Therefore, there can be provided the electrode catalyst layer, the electrode, the membrane electrode assembly and the fuel cell, each of which is capable of realizing the excellent power generation performance by enhancing the apparent catalytic activity and the proton transport properties even in the case of lowering the supported amount of the catalyst.

REFERENCE SIGNS LIST

1 FUEL CELL (STACK)
10 MEMBRANE ELECTRODE ASSEMBLY
13 ELECTRODE CATALYST LAYER
131 ELECTRODE CATALYST
131a SUPPORT
131b CATALYST
133, 133a, 133b, 133c, 133a', 133b', 133c', 133α, 133β, 133γ PROTON-CONDUCTIVE MATERIAL
135 CATALYZER

The invention claimed is:

1. A fuel cell electrode catalyst layer comprising a catalyzer, the catalyzer comprising:
   a catalyst;
   a support that supports the catalyst; and
   two or more proton-conductive materials different in dry mass value per mole of a proton-donating group, all of the proton-conductive materials being in contact with at least a part of the catalyst and at least a part of the support,
   wherein a proton-conductive material in which a dry mass value per mole of the proton-donating group is highest among the proton-conductive materials is in contact with at least a part of the catalyst, and has a largest contact ratio of the proton-conductive materials with a surface of the catalyst among the proton-conductive materials.

2. The fuel cell electrode catalyst layer according to claim 1, wherein the proton-donating group is a sulfonic acid group, and
   a dry mass value per mole of the sulfonic acid group in the proton-conductive material in which a dry mass value per mole of the sulfonic acid group is highest among the proton-conductive materials is 1200 g/eq or more.

3. The fuel cell electrode catalyst layer according to claim 1, wherein the proton-donating group is a sulfonic acid group, and
   the proton-conductive materials include a proton-conductive material in which a dry mass value per mole of the sulfonic acid group is 1200 g/eq or more, and
   a ratio, with respect to the support, of the proton-conductive material in which the dry mass value per mole of the sulfonic acid group is 1200 g/eq or more is 0.5 or less in a mass ratio.

4. The fuel cell electrode catalyst layer according to claim 1, wherein the proton-donating group is a sulfonic acid group, and
the proton-conductive materials are composed of: a proton-conductive material in which a dry mass value per mole of the sulfonic acid group is 1200 g/eq or more; and a proton-conductive material in which a dry mass value per mole of the sulfonic acid group is 700 g/eq or less.

5. The fuel cell electrode catalyst layer according to claim 1, wherein a contact ratio (θ) of the proton-conductive materials with the support is 0.4 or more, the contact ratio (θ) being represented by a following Expression (1):

$$\theta = (C_{dl\_30\%})/(C_{dl\_100\%}) \quad (1)$$

where "$C_{dl\_30\%}$" is an electrical double layer capacitance at relative humidity of 30%, and "$C_{dl\_100\%}$" is an electrical double layer capacitance at relative humidity of 100%.

6. The fuel cell electrode catalyst layer according to claim 1, wherein a supported amount of the catalyst is 0.35 mg/cm$^2$ or less.

7. The fuel cell electrode catalyst layer according to claim 1, wherein a supported amount of the catalyst is 0.12 mg/cm$^2$ or less.

8. The fuel cell electrode catalyst layer according to claim 1, wherein the support is a carbon support, and a specific surface area of the carbon support is 150 m$^2$/g or more.

9. The fuel cell electrode catalyst layer according to claim 8, wherein a contact ratio (θ) of the proton-conductive materials with the carbon support is 0.4 or less, the contact ratio (θ) being represented by a following Expression (1):

$$\theta = (C_{dl\_30\%})/(C_{dl\_100\%}) \quad (1)$$

where "$C_{dl\_30\%}$" is an electrical double layer capacitance at relative humidity of 30%, and "$C_{dl\_100\%}$" is an electrical double layer capacitance at relative humidity of 100%.

10. The fuel cell electrode catalyst layer according to claim 1, wherein the support is a carbon support, and a specific surface area of the carbon support is 700 m$^2$/g or more.

11. The fuel cell electrode catalyst layer according to claim 10, wherein a contact ratio (θ) of the proton-conductive materials with the carbon support is 0.35 or less, the coating ratio contact ratio (θ) being represented by a following Expression (1):

$$\theta = (C_{dl\_30\%})/(C_{dl\_100\%}) \quad (1)$$

where "$C_{dl\_30\%}$" is an electrical double layer capacitance at relative humidity of 30%, and "$C_{dl\_100\%}$" is an electrical double layer capacitance at relative humidity of 100%.

12. A fuel cell electrode comprising: the fuel cell electrode catalyst layer according to claim 1.

13. A fuel cell membrane electrode assembly comprising: the fuel cell electrode catalyst layer according to claim 1.

14. A fuel cell comprising: the fuel cell membrane electrode assembly according to claim 13.

15. A fuel cell comprising:
a fuel cell membrane electrode assembly having a fuel cell electrode catalyst layer, the fuel cell electrode catalyst layer comprising a catalyzer comprising:
a catalyst;
a support that supports the catalyst; and
two or more proton-conductive materials different in dry mass value per mole of a proton-donating group, the proton-conductive materials being in contact with at least a part of the catalyst and at least a part of the support, wherein
a proton-conductive material in which a dry mass value per mole of the proton-donating group is highest among the proton-conductive materials is in contact with at least a part of the catalyst, and has a largest contact ratio of the proton-conductive materials with a surface of the catalyst among the proton-conductive materials,
the fuel cell electrode catalyst layer has the catalyzer in a plane of the electrode catalyst layer, and a mass ratio of a proton-conductive material with a low dry mass value per mole of the proton-donating group to a proton-conductive material with a high dry mass value per mole of the proton-donating group differ in portions of the plane of the fuel cell electrode catalyst layer, and
the catalyzer is contained in a manner such that the catalyzer in which a mass ratio of the proton-conductive material with the high dry mass value per mole of the proton-donating group to the proton-conductive material with the low dry mass value per mole of the proton-donating group is large is arranged in a region where relative humidity of gas in a gas flow passage is 90% or more, and the catalyzer in which the mass ratio is small is arranged in a region where relative humidity of gas in the gas flow passage is less than 90%.

16. A fuel cell comprising:
a fuel cell membrane electrode assembly having a fuel cell electrode catalyst layer, the fuel cell electrode catalyst layer comprising a catalyzer comprising:
a catalyst;
a support that supports the catalyst; and
two or more proton-conductive materials different in dry mass value per mole of a proton-donating group, the proton-conductive materials being in contact with at least a part of the catalyst and at least a part of the support, wherein
a proton-conductive material in which a dry mass value per mole of the proton-donating group is highest among the proton-conductive materials is in contact with at least a part of the catalyst, and has a largest contact ratio of the proton-conductive materials with a surface of the catalyst among the proton-conductive materials,
the fuel cell electrode catalyst layer has the catalyzer in a plane of the electrode catalyst layer, and a mass ratio of a proton-conductive material with a low dry mass value per mole of the proton-donating group to a proton-conductive material with a high dry mass value per mole of the proton-donating group differ in portions of the plane of the fuel cell electrode catalyst layer, and
the catalyzer is contained in a manner such that the catalyzer in which a mass ratio of the proton-conductive material with the high dry mass value per mole of the proton-donating group to the proton-conductive material with the low dry mass value per mole of the proton-donating group is large is arranged in a region in a vicinity of a gas discharge port, and the catalyzer in which the mass ratio is small is arranged in a region other than a vicinity of the gas discharge port.

17. The fuel cell electrode catalyst layer according to claim 1, wherein the electrode catalyst layer is formed on a surface of a polymer electrolyte membrane.

18. The fuel cell electrode catalyst layer according to claim 1, wherein the two or more proton-conductive materials are concentric.

* * * * *